(12) United States Patent
Rogers et al.

(10) Patent No.: US 7,444,216 B2
(45) Date of Patent: Oct. 28, 2008

(54) USER INTERFACE FOR DISPLAY OF TASK SPECIFIC INFORMATION

(75) Inventors: Kevin B. Rogers, Newport Beach, CA (US); John Michael Robertson, Pleasant Grove, UT (US); Caleb J. Beard, Eagle Mountain, UT (US)

(73) Assignee: Mobile Productivity, Inc., Newport Beach, CA (US)

( * ) Notice: Subject to any disclaimer, the term of this patent is extended or adjusted under 35 U.S.C. 154(b) by 570 days.

(21) Appl. No.: 11/035,751

(22) Filed: Jan. 14, 2005

(65) Prior Publication Data

US 2006/0161313 A1    Jul. 20, 2006

(51) Int. Cl.
G01M 17/00    (2006.01)
G06F 17/30    (2006.01)

(52) U.S. Cl. .................. 701/33; 702/183; 715/792
(58) Field of Classification Search .............. None
See application file for complete search history.

(56) References Cited

U.S. PATENT DOCUMENTS

| | | | |
|---|---|---|---|
| 4,404,639 A | | 9/1983 | McGuire et al. |
| 4,899,292 A | * | 2/1990 | Montagna et al. ........ 707/104.1 |
| 5,528,496 A | * | 6/1996 | Brauer et al. ................. 701/32 |
| 5,715,374 A | * | 2/1998 | Heckerman et al. ........... 706/46 |
| 5,774,361 A | * | 6/1998 | Colarelli et al. ............... 701/29 |
| 5,884,202 A | * | 3/1999 | Arjomand ..................... 701/29 |
| 6,052,631 A | * | 4/2000 | Busch et al. ................... 701/29 |
| 6,141,608 A | * | 10/2000 | Rother ........................ 701/33 |
| 6,636,790 B1 | * | 10/2003 | Lightner et al. ............... 701/33 |
| 6,697,894 B1 | | 2/2004 | Mitchell et al. |
| 6,714,846 B2 | * | 3/2004 | Trsar et al. ..................... 701/33 |
| 7,092,937 B2 | * | 8/2006 | Morgan et al. ................. 707/3 |
| 7,117,452 B1 | * | 10/2006 | Pavelski et al. ............. 715/792 |
| 7,142,960 B2 | * | 11/2006 | Grier et al. ..................... 701/29 |
| 7,209,860 B2 | * | 4/2007 | Trsar et al. ................... 702/183 |
| 2002/0007237 A1 | * | 1/2002 | Phung et al. ................... 701/33 |
| 2004/0220772 A1 | * | 11/2004 | Cobble et al. ............... 702/183 |

* cited by examiner

*Primary Examiner*—Michael J. Zanelli
(74) *Attorney, Agent, or Firm*—Knobbe Martens Olson & Bear LLP

(57) ABSTRACT

A graphical user interface is configured to display information related to diagnosis and/or repair of various objects, such as automobiles. The GUI displays relevant reference information, of any type, next to procedure steps of a selected diagnostic or repair procedure. Advantageously, reference information from multiple sources may be automatically selected for display in the GUI according to a current task that is selected by the user. Accordingly, a technician viewing the GUI does not need to access any other reference information, valuable man hours are spared, and efficiency increases. In one embodiment, the layout and immediate availability of relevant reference information may also increase the learning capabilities of the viewing technician. Thus, the layout of information in the GUI as described herein may facilitate increased employee productivity and increased employee learning.

26 Claims, 16 Drawing Sheets

| Search | Reference |

Enter information to search either by System/Reference Type OR by Keyword:

| Year | * | 1999 | System: | Reference Type: |
| Make | * | Chevrolet | | |
| Model | * | Corvette | | - OR - |
| Sub | * | Base | Keyword: | |
| Engine | * | 5.7L V8 G OHV (MFI) | brake replacement | [Search] |

| Relevance ▽ | Reference |
|---|---|
| 100.0 % | WARRANTY ADMIN. BRAKE ROTOR WARRANTY SERVICE PROCEDURE |
| 100.0 % | BRAKE CALIPER/KNUCKLE MAINTENACE INSPECTION (DISC BRAKES) |
| 90.1 % | BRAKE CALIPER REPLACEMENT - FRONT (DISC BRAKES) |
| 90.0 % | BRAKE CALIPER REPLACEMENT - REAR (DISC BRAKES) |
| 88.7 % | BRAKE PADS REPLACEMENT (DISC BRAKES) |
| 87.1 % | ABS OPERATION (ANTILOCK BRAKE SYSTEM) |
| 84.0 % | VACUUM BRAKE BOOSTER REPLACEMENT (HYDRAULIC BRAKES) |
| 83.2 % | BRAKE CALIPER OVERHAUL - FRONT (DISC BRAKES) |
| 83.2 % | BRAKE CALIPER OVERHAUL - REAR (DISC BRAKES) |
| 79.0 % | PARK BRAKE LEVER ASSEMBLY REPLACEMENT |
| 76.1 % | BRAKE ROTOR REPLACEMENT - REAR (DISC BRAKES) |
| 75.7 % | BRAKE HOSE REPLACEMENT - FRONT (DISC BRAKES) |
| 75.7 % | BRAKE HOSE REPLACEMENT - REAR (DISC BRAKES) |
| 74.9 % | BRAKE PRESSURE MODULATOR VALVE (BPMV) REPLACEMENT (BPMV REPLACEMENT/ANTILOCK BRAKE SYSTEM |

920

| Quick Fix | Symptom Help | Components/ Tools | Electrical/ Diagrams | Scan Tool Help | System Info | General Info |

FIG. 10F

USER INTERFACE FOR DISPLAY OF TASK SPECIFIC INFORMATION

BACKGROUND OF THE INVENTION

1. Field of the Invention

This invention relates generally to management of information useful in diagnosing and repairing various objects, and more particularly to improved user interfaces for viewing and managing information related to vehicles.

2. Description of the Related Art

In the automotive repair industry, access to information regarding particular specifications of automobiles may be important, and sometimes essential, for properly diagnosing a symptom of an automobile and determining an appropriate repair procedure. Currently, many automobile manufacturers publish specification manuals that include detailed information regarding one or more automobiles. These manuals typically include a table of contents, multiple chapters directed to various portions of the automobiles, and an index. A technician at an automobile repair shop may use these specification manuals extensively in identifying symptoms and performing repair procedures.

In the recent past, many of the automobile specification manuals have been made available in an electronic format, such as in Adobe pdf format, so that users may store the manuals on a computer and view portions of the manual on a display device, as necessary. However, searching of these electronic specification manuals is generally limited, or, in some cases, not possible at all. Thus, the user typically must view the index or table of content portion of a manual on a display device in order to determine which pages of the electronic specification manual contain the desired information. Systems and methods for allowing the information in electronic specification manuals to be more easily and comprehensibly available to a user are desired.

Information that may be relevant to a particular diagnostic or repair procedure may be found in multiple locations within a specification manual. Thus, locating all of the information that may be relevant to a given procedure (including both diagnostic and repair procedures) is often complex and time consuming. Similarly, information that may be relevant to a particular system, or subsystem, of an automobile may be found in multiple locations within a specification manual, in multiple specification manuals, or in other reference materials, including materials that are available on the Internet. Accordingly, improved systems and methods for organizing the information contained in these various reference materials and providing the information to a user, such as via a graphical user interface (GUI), are desired.

A typical automobile repair shop may, for example, use a specification manual for a certain make and model of automobile in order to diagnose symptoms of a subject automobile. During the diagnosis, certain reference information, such as the location of particular electrical components, the manufacturer's suggested torque settings, or instructions for using a particular tool referred to in the diagnosis procedure, may not be located on the same page as the diagnosis procedure. In fact, the reference information may be in another book or another section of the specification manual, for example. In either case, additional effort and time is required for the technician to locate the desired reference information. Accordingly, improved systems and methods for displaying related information, such as in a GUI on a display device, are desired. In addition, improved systems and methods for updating a GUI with information obtained from various sources according to the current task being performed by the technician are desired.

SUMMARY OF THE INVENTION

In one embodiment, a computer executable program executing on a computing device is configured to generate a graphical user interface including information related to a vehicle. The graphical user interface may comprise a procedure pane including procedure information, wherein the procedure information comprises a plurality of sub-procedures describing respective steps of the procedure, and the computer executable program is configured to display one of the plurality of sub-procedures in the procedure pane in response to communication with an input device. The graphical user interface further comprises a reference pane including selectable reference information tabs, each of the reference information tabs being related to the displayed one of the plurality of sub-procedures, wherein the reference information tabs are updated in response to changing which of the one of the plurality of sub-procedures is displayed.

In another embodiment, a method of displaying information on a display device of a computing system, wherein the information is related to an object, comprises receiving an input from a user of the computer system indicating a selected object, receiving an input from the user indicating a selected procedure related to the selected object, allocating a total display area of the display device into two non-overlapping panes, namely, a procedure pane and a reference pane, displaying in the procedure pane information related to performing the selected procedure on the selected object, and displaying in the reference pane information related to the selected object and the selected procedure.

In another embodiment, information for display on a portable computing device comprises task information displayed in a task pane and reference information displayed in a reference pane, wherein the task and reference information are concurrently displayed on the portable computing device. A method of selecting information for display comprises selecting a vehicle on which to perform a procedure, wherein the procedure is selected from the group comprising a diagnostic procedure and a repair procedure, receiving one or more symptoms from an input device, and determining the procedure that is to be performed on the vehicle based on the selected vehicle and the one or more symptoms.

In another embodiment, a portable computing device has a display configured to concurrently display a procedure pane including procedure information related to a procedure that may be performed on an automobile, wherein the procedure information comprises a plurality of sub-procedures related to steps of the procedure, and the display is configured to display one of the plurality of sub-procedures in the procedure pane in response to communication with an input device, the procedure pane further comprising one or more selectable items each associated with a respective sub-procedure, and a reference pane including one or more reference information tabs each corresponding to a particular piece of reference information that is related to the displayed one of the plurality of sub-procedures, wherein the one or more reference information tabs are updated in response to changing which of the plurality of sub-procedures is displayed.

In another embodiment, a computer executable program executing on a computing device is configured to generate a graphical user interface including information related to a procedure, wherein the graphical user interface comprises a first pane displaying vehicle information regarding a specific vehicle, a second pane displaying procedure information, wherein the procedure information comprises information for performing a procedure on the specific vehicle and is selected from the group comprising a repair procedure and a diagnostic procedure, and a third pane displaying reference information regarding the specific vehicle, wherein the vehicle information, the procedure information, and the reference information are each related to the procedure and are each concurrently displayed on a display device.

In another embodiment, a method of updating a database with information regarding a plurality of procedures corresponding to a vehicle symptom comprises receiving information from one or more vehicle service centers rating one or more of the plurality of procedures according to the effectiveness of the respective procedures in reducing the vehicle symptom, ranking the plurality of procedures according to the information received from the one or more vehicle service centers, and providing a highest ranked procedure to a vehicle service center in response to a request for a procedure corresponding to the vehicle symptom.

BRIEF DESCRIPTION OF THE DRAWINGS

FIG. 10B is a partial screen shot illustrating the task information pane when the RO list tab is selected.

FIG. 10C is a partial screen shot illustrating the task information pane when the RO in progress tab is selected.

FIG. 10F is a partial screen shot illustrating an exemplary reference information pane when the search button is selected.

DETAILED DESCRIPTION OF CERTAIN EMBODIMENTS OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The term "module," as used herein, means, but is not limited to, a software or hardware component, such as a field programmable gate array (FPGA) or an application specific integrated circuit (ASIC), which performs certain tasks. A module may advantageously be configured to reside on an addressable storage medium and be configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 1:
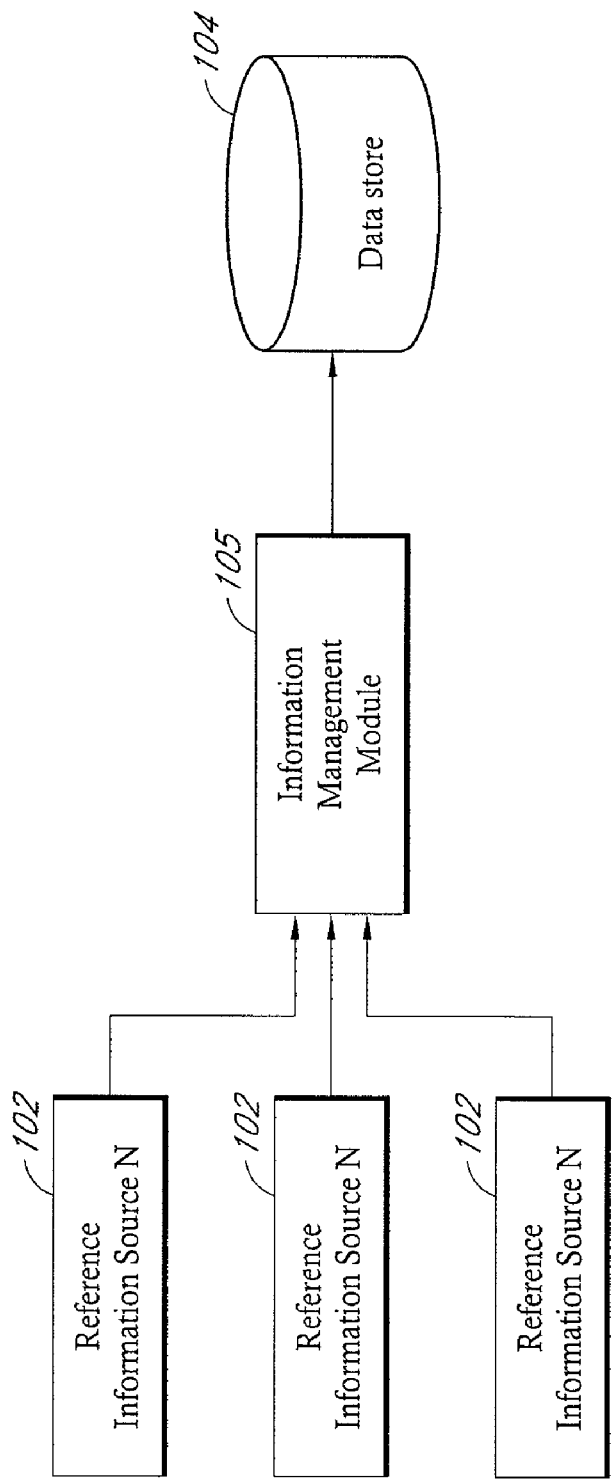
FIG. 1 is a block diagram illustrating the top-level components used in an exemplary system for converting data from one or more formats into a known useful format.

FIG. 1 is a block diagram illustrating the top-level components used in an exemplary system for converting data from one or more formats into a known useful format. As shown in FIG. 1, multiple reference information sources 102 are each in data communication with an information management module 105. In one embodiment, each of the reference information sources provides information regarding automobile specifications to the information management module 105. For example, Reference Information Source A may contain data regarding a Ford automobile, Reference Information Source B may contain data regarding a Toyota automobile, and Reference Information Source C may contain data regarding a Mitsubishi automobile. In one embodiment, one or more of the reference information sources 102 provides scanned images of specification manuals. In another embodiment, one or more of the reference information sources 102 provides digital character data, such as ASCII text, that corresponds to the text information in a specification manual. In this embodiment the reference information source 102 may also include images, such as may be stored in jpg (Joint Photographic Experts Group) format, that correspond to images included in a specification manual.

The information management module 105 is configured to receive data from multiple reference information sources 102, in various formats, and convert the information into a known format that may be stored in a data store 104 and accessed by a user interface. The information management module 105 is coupled to the data store 104, which is configured to store the converted information in the known format. Because all of the data is stored in a known format, users may more easily search information from multiple specification manuals and access the information with a single interface. As will be described in further detail below, the data stored in the data store 104 is advantageously tagged so that pages of a specification manual that may be relevant to a specific diagnostic procedure, repair procedure, or system of the automobile may be easily located and transmitted to the user.

Figure 2A:
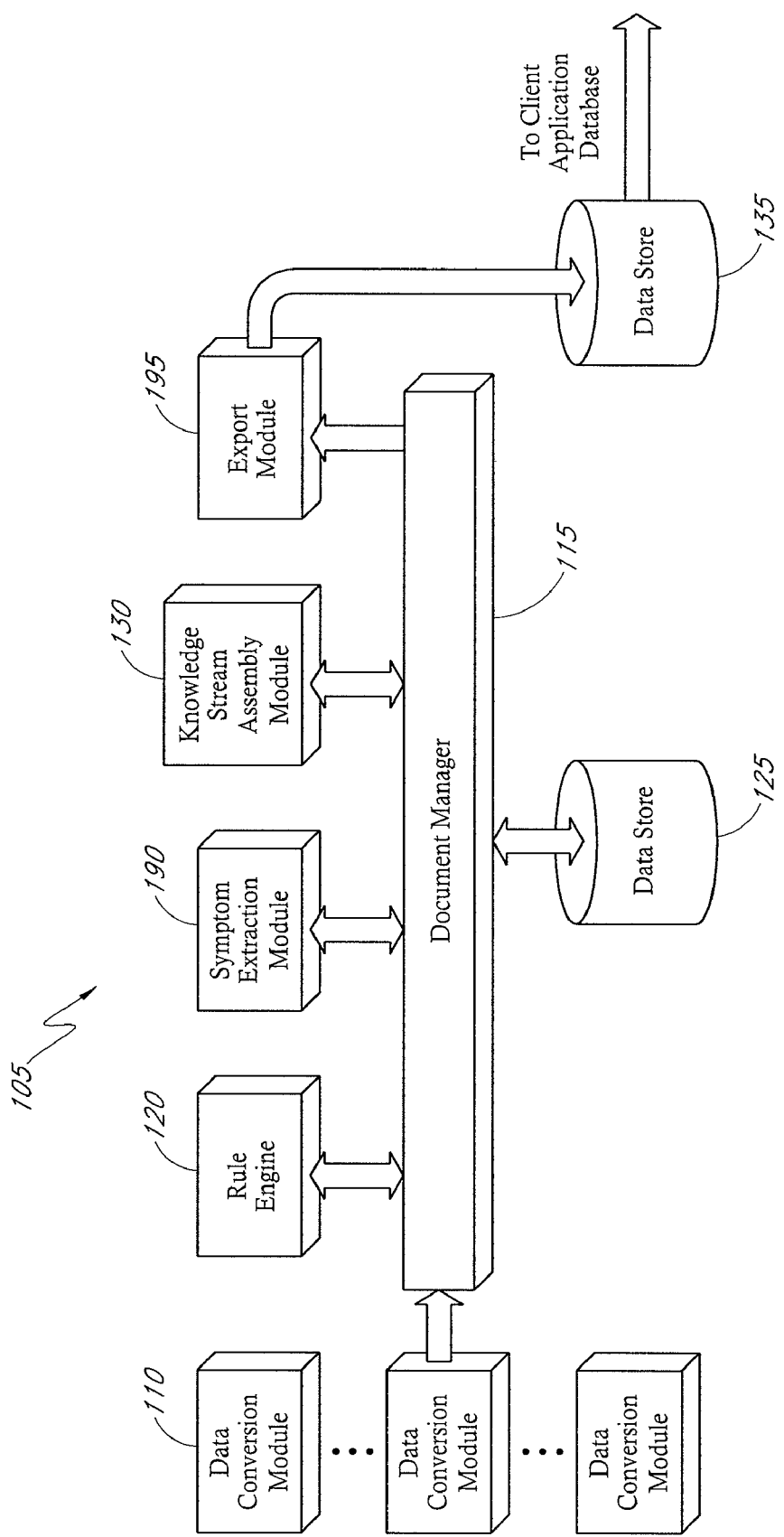
FIG. 2A is a block diagram illustrating modules that are included in the information management module of FIG. 1.

FIG. 2A is a block diagram illustrating modules that are included in the information management module 105 of FIG. 1. In one embodiment, each of the modules illustrated in FIG. 2A is located at the same location and interface with one another via direct data cable connections or a wired or wireless local area network ("LAN"), for example. In another embodiment, one or more of the modules illustrated in FIG. 2 are located remote from the other modules and communicate with the document manager 115 via a wide area network ("WAN"), such as the Internet. In another embodiment, the modules illustrated in FIG. 2A are each software objects stored on a single computing device.

As shown in FIG. 2A, the exemplary information management module 105 includes a document manager 115 coupled to each of the other illustrated modules. In an advantageous embodiment, the document manager 115 comprises a computing device running an operating system, such as a PC, MAC, or LINUX based operating system. The document manager 115 is advantageously configured to communicate with various devices and receive input in various formats. In addition, the document manager 115 is configured to output information to various devices and in various formats.

Figure 2B:
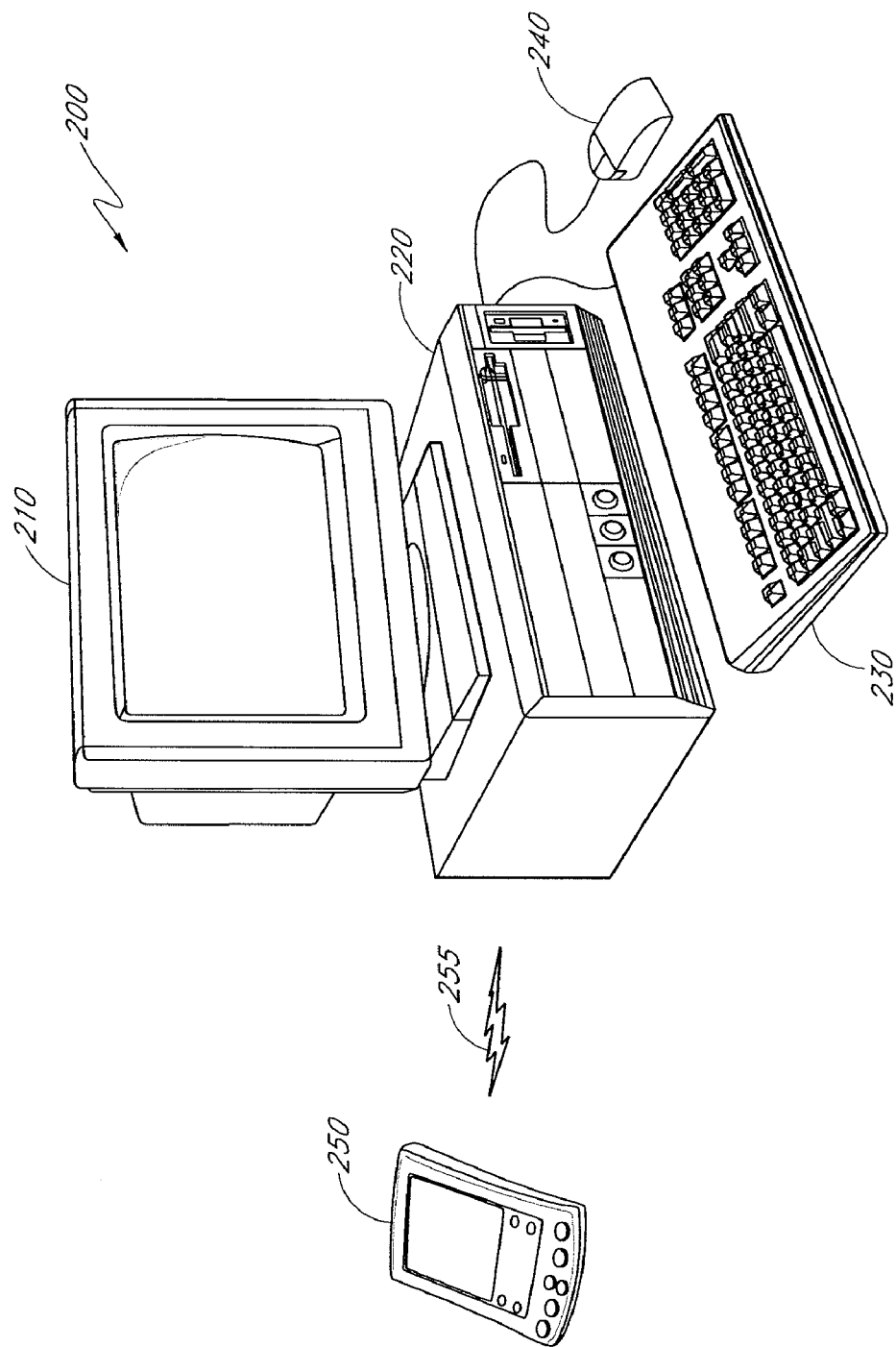
FIG. 2B is a perspective view of an exemplary computer system.

FIG. 2B is a perspective view of an exemplary computer system 200. In one embodiment, the document manager 115 comprises a computing device, such as the computer system 200. In addition, each of the users, such as an automobile repair shop, comprises one or more computing devices that are similar to the computer system 200. The exemplary computer system 200 comprises a display 210 coupled to a computer 220. The computer system 210 may be coupled to one or more computing devices via any type of networking connection. A plurality of user input devices may be coupled to the computer 200, such as a keyboard 230 and a mouse 240. The user input devices may also include a touch screen, joystick, trackball, and microphone, for example. The peripheral devices listed above, and any other available peripheral devices, may be coupled to the computer 110 via wired or wireless connections, and the computer 220 may be coupled to a network via a wired or wireless connection. As will be appreciated by those skilled in the technology, the computer system 200 as described herein is not limited to the device illustrated in FIG. 2, but may be, for example, a personal digital assistant (PDA), cellular telephone, pager, or any computing device configured to display text, images or sounds (signs) to a user.

In the embodiment of FIG. 2B, a portable computing device 250 is in communication with the computer 220 via a wireless communication link. In one embodiment, the portable computing device 250 comprises a notebook or tablet computer. In another embodiment, the portable computing device 250 comprises a personal digital assistant (PDA), a cell phone, or any other suitable electronic device comprising a display and an information processor. In an advantageous embodiment, the data generated by the information management module 105 may be accessed by the computer system 200, which may be located at an automobile repair shop, for example.

Returning to FIG. 2A, the Data conversion modules 1 10 are each configured to receive data from one or more different data sources, such as information providers at Mitsubishi, Honda, Ford, General Motors ("GM"). For example, one of the data conversion modules 110 may be configured to receive automobile specification data in XML format from Mitsubishi Motors, while another data conversion module 110 may be configured to receive automobile specification data in PDF format from Ford Motors and yet another data conversion module 110 is configured to receive automobile specification data in another format from GM.

In an advantageous embodiment, the data conversion modules 110 convert the received information into a known format and classify portions of the information into one or more of several views. In one embodiment, these views include a table of contents view, a type view, and an extracted view. The table of contents view indicates the hierarchal organization of pages included in the specification manual. In one embodiment, each of the pages of a specification manual is stored in a database. An identifier for each of the pages may then be stored in a separate page list, and references to the identifiers of these pages may be organized in various manners. Each of these various organizations of pages, or organizations of page identifiers, comprises a page view. For example, a table of contents view may contain section headings included in the specification manual along with a pointer to the identified pages stored in a storage device. Thus, the table of contents view provides a sequential hierarchy of the information contained in a specification manual.

In one embodiment, a type view classifies pages of the specification manual into page types, which may include, for example, component, diagnostic, and special tools pages. The type view may further classify the pages into procedures so that by accessing the type view, a user may determine all pages that relate to a particular procedure category. For example, a type view may classify pages into one of multiple different procedure types, such as DTC trouble shooting procedures, component inspection procedures, or repair procedures. Thus, a user may easily locate all circuit diagrams, for example, by accessing the circuit diagram section within the type view of a manual. In one embodiment, many of the pages in the table of contents view are also referenced in the type view. For example, in one embodiment the table of contents view includes all pages, while the type view includes a subset of the pages in the table of contacts view. Thus, identifiers for many pages may be included in multiple views and the identified pages may be located from different views. For example, a specification manual may be converted by the data conversion module 110 to include a special tools view, including an identifier for a page dealing with the use of an oil filter removal tool. The identifier for this same page may also be listed in the table of contents view as a subtopic of an engine care section of the specification manual, for example.

In another embodiment, identifiers for some pages of the specification manual are included in an extracted view, which further classifies content on the pages. For example, portions of a procedure page in the type view may be classified as (1) steps in the procedure or (2) reference information that is specific to that procedure.

In some instances, the data received from a data source identifies pages that correspond with each of the views used by a particular data conversion module 110. In this embodiment, the pages may be classified into one or more views according to the data received from the data source. In another embodiment, the data received from the data source does not include any information that classifies pages into views. Thus, in this embodiment, the pages are analyzed, by machine and/or human recognition, in order to classify the pages into one or more views.

The information management module 105 also includes a data store 125, which may be any type of storage device, such as a hard drive or optical storage device. The information stored on the data store 125 may be organized and physically stored on data store 125 according to any methods known in the art. When the various views, discussed above, are generated from the data received from one or more data sources, the views are stored in the data store 125. The data store 125 is advantageously electronically coupled to the other modules of the information management module 105 so the views may be accessed by any of these modules and so that additional information may be stored and accessed on the data store 125.

Rule engine 120 is configured to receive the pages that have been accessed by the data conversion modules 110 and to classify the pages into one or more categories. The rule engine assigns tags or labels to each page in the page store. The tags reflect the various categorizations of each page. These tags are later used by the knowledge stream assembly module 130. In one embodiment, pages received from the data conversion modules may be classified into one or more of three groups, namely, global reference information, system reference information, or procedure descriptions.

Global reference information may include, for example, pages including information that a user will want to access no matter what task they are working on. For example, pages including contact information for the vehicle manufacturer and information regarding translation of a VIN number into a model number may be classified as global reference information.

System reference information is information that relates to a particular automobile system, such as the transmission, engine, or brakes, for example. In one embodiment, subsystems, such as fuel injection, heating/cooling, and electrical subsystems related to an engine, for example, may also be included as automobile systems. Thus, the pages from the various specification manuals may be categorized at varying levels according to the systems, or subsystems, to which the information relates.

Procedure descriptions generally describe a diagnostic, maintenance, or repair procedure (referred to herein generally as procedures). Typically, these procedures have specific steps for performing the procedures, and may also have pieces of reference information within them that are specific to each procedure. For example, repair procedures included in many specification manuals are organized into tables that include steps to be taken in performing each procedure. In one embodiment, a procedure description is in the form of a table or a list. In other embodiment, the procedure descriptions are organized in other formats known in the art.

A symptom extraction module 190 is coupled to the document manager 115 and is configured to identify symptoms for which diagnostic procedures may be relevant. The association of symptoms to a specific procedure may be useful in further categorizing those pages into a more granular view of the data.

A knowledge stream assembly module 130 is coupled to the document manager 115. After the data pages have been categorized using the above-described modules, the knowledge stream assembly module compiles the pages into multiple enhanced procedure lists, referred to herein as "knowledge streams." In one embodiment, the knowledge stream assembly module 130 processes the categorizations of the rules engine 120 in order to generate knowledge streams. For example, all categorized data that is relevant to a specific procedure may be combined into a knowledge stream including the procedure itself with steps of the procedure having links to all of the reference information related to that step, or the entire procedure. Further details regarding the generation and content of knowledge streams are included below with reference to FIG. 3.

An export module 195 is coupled to the document manager 115 and is configured to change the format of the data maintained in the data store 125 according to the various requirements of users. For example, some users request that knowledge streams, or other data, be formatted for viewing on a portable device with specific dimensions, while other users may request knowledge streams in other formats and may also request copies of all specification manual pages referenced in a knowledge stream. In one embodiment, the pages, or other data, requested by users is converted by the export module 195 and stored in a data store 135 until retrieved by the requesting user. For example, the requested data may be formatted for storage as one or more XML documents. In another embodiment, the converted data may be stored in the data store 135 even after the requesting user has retrieved a copy of the data. Thus, the data may be retrieved by other users that request the same data in the same format. This may be advantageous, for example, if a chain of automobile repair shops require data in a particular format. In this example, by storing the converted data in the data store 135, the data may be accessed by any of the chain of repair shops without the need to reconvert the same data.

When a requesting user receives the requested data, such as a knowledge stream (discussed in further detail with respect to FIG. 3), the user may manipulate the data for presentation on one or more display devices. For example, portions of the requested data may be extracted for viewing in separate panes that are presented on a display device.

Figure 3:
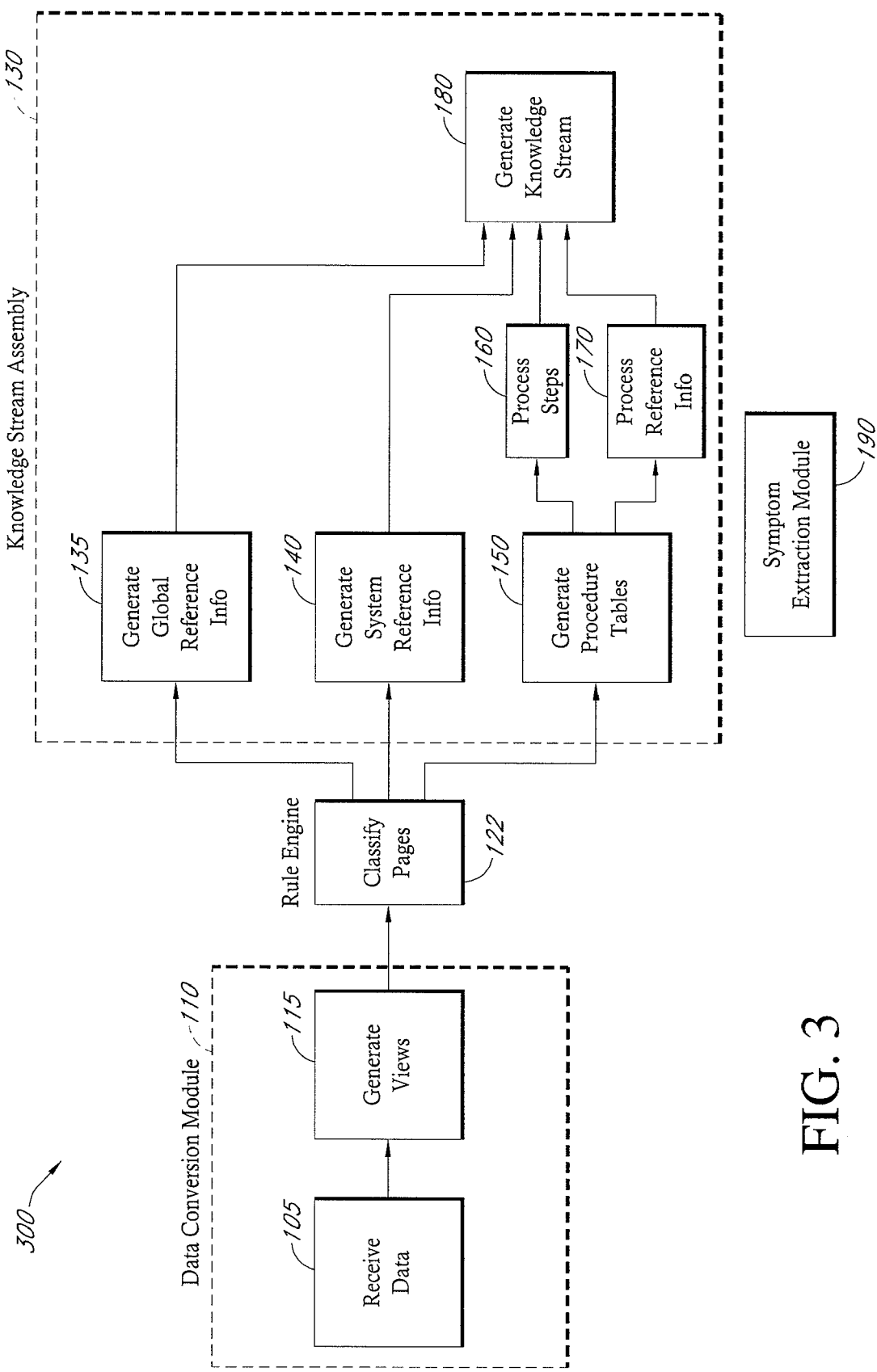
FIG. 3 is a flow diagram illustrating the movement of data that is received from various information sources in the generation of knowledge streams.

FIG. 3 is a flow diagram illustrating the movement of data that is received from various information sources in the generation of knowledge streams. As illustrated in FIG. 3, the process has been divided into steps performed by the data conversion module 110, the rule engine 120, the knowledge stream assembly module 130, and the symptom extraction module 190. While methods are described below with respect to specific modules, any of the steps illustrated in FIG. 3 may be performed by any of the other illustrated modules, or any other component of the information management module 105.

In a step 105, data from a data source is received by the data conversion module 10. As described above, the data may be in one of many different formats and may be received from various data sources. In one embodiment, pages of a specification manual are received by the data conversion module 110 in a graphic format, such as in PDF, JPG, or TIF format. For purposes of illustration, the description below often refers to classification of pages, referring to pages of an automobile specification manual. However, any reference herein to a page should be read to cover any other data, such as a portion of a page or electronic data.

Continuing to a step 115, the data conversion module 115 classifies portions of the data into one or more of several views. In one embodiment, each page of a specification manual is included in one or more views. In one embodiment, these views include a table of contents view, a type view, and an extracted view. In another embodiment, additional, or fewer, views may be used in categorizing received data.

Moving to a step 122, the rule engine 120 classifies and labels data, such as pages or portions of pages, into one or more classifications. These classifications may then be stored in the data store 125 for access by other modules of information management module 105. As described above, in one embodiment, pages may be classified into one or more of three classifications, namely, global reference information, system reference information, or procedure descriptions.

In one embodiment, rules are applied to the content of the received data, such as on a per page basis, in order to categorize and label each page, or portion of a page, properly. In one embodiment, automatic rules, manual rules, and inherited rules may each be used to classify data. In an advantageous embodiment, the automatic rules are applied first, followed by inherited rules, and then manual rules. Thus, after application of the automatic rules, data that was not classified automatically may be classified according to manual or inherited rules. Each of these rule types is described further below. In addition, other types of rules may also be applied to the received data.

Automatic rules are typically applied by a computing device without the need for human input. For example, in one embodiment, an automatic rule includes an algorithm that identifies certain features on a page, assigns a score for each of these features, and based upon the total of the scores for the page, determines that the page should be classified into a particular category. Automatic rules may be generated by a human or by artificial intelligence training, for example. In either case, automatic rules are able to automatically take a piece of content, analyze the content, and determine one or more labels that should be applied to the content.

Automatic rules may be defined to identify certain features of a procedure description, for example, so that a procedure description may be automatically identified. For example, if a symptom table, which is basically a table with a list of symptoms, includes a link to a particular page, the automatic rules may score the particular page as including a procedure description. If the word "procedure" appears in bold letters in a heading position, the data may get another score indicating that the data includes a procedure description. Other scores may also be assigned to a page indicating that the page is another category of information, such as a symptom table, for example. After the rules are applied to a page, the scores are summed and the page is categorized based on the various sums. In one embodiment, threshold score totals for categorizing data into a specific category are established. For example, if four scores indicate that data contains a procedure description, and no other category received more than one score, the data may be categorized as containing a procedure description. In a similar manner, other categories may be assigned to data based upon common features that are in each type of information.

In another embodiment, automatic categorization of pages, such as categorization of pages as procedure descriptions, may be performed by the data conversion module 110.

In one embodiment, information that cannot satisfactorily be classified automatically may be classified manually by a person. For example, if a page has not been classified by an automatic rule, a person may view the page on a computer display device and determine the appropriate label, or labels, that should be applied to the page. This process generates a manual rule that the system can reapply in the future. Thus, the manual rule generation effort must be performed only once for a particular data set.

Inherited rules are a collection of manual rules applied to a new data set. In one embodiment, the system automatically determines which rules from the collection are productive within the new data set. The inherited rules look for sections of data that correspond with data that has already been categorized. The section of data, such as a page, a portion of a page, or multiple pages, may then inherent the same classifications as the data that was previously categorized. For example, if a set of classification rules is developed that applies to the specification manual for the 2003 Galant, the system may determine that some of the classification rules are applicable to the specification manual for the 2004 Galant. Thus, portions of the data from the 2004 Galant manual may be categorized using the categorizations that were used for the 2003 Galant manual. In an advantageous embodiment, inherited rules that apply to particular data are determined automatically so that manually generated rules may be used to categorize any portions for which inherited rules are not appropriate. In one embodiment, inherited rules are developed based on the analysis of multiple manuals and the determination of structures that are common across the analyzed manuals. Accordingly, the common structures in multiple manuals may be used to generate a template for inheritable rules.

After the data pages have been categorized using the above-described processes, a knowledge stream assembly module 130 generates multiple enhanced procedure lists, referred to as Knowledge Streams, based on the page categorizations received from the data conversion module 110 and rule engine 120. At this point, all pages are labeled as a complete process description, a step in a process, a piece of reference material related to a particular process, a piece of reference information related to a particular system in the automobile, or a piece of reference information that is generally related to an automobile, for example. The knowledge stream assembly module 130 accesses these categorizations in order to generate knowledge streams.

In a step 135, the knowledge stream assembly module 130 generates global reference information for use in all knowledge streams. In one embodiment, a knowledge stream may be directed specifically to global reference information so that a user may retrieve any global reference information from a single knowledge stream. The global reference information may also be compiled for use in other knowledge streams.

In a step 140, the knowledge stream assembly module 130 generates system reference information for use in one or more knowledge streams. For example, all information regarding a transmission system may be compiled for use in one or more knowledge streams. This exemplary compilation of transmission system information may include links to other similar procedures relating to the transmission system. As described above, a system may be either a broad system of the automobile, such as transmission, engine, or electrical, or system may include a subsystem, such as fuel injection, power seats, or brake pads, for example. Thus, depending on the level of granularity to which the information management module 105 is set, information regarding fewer or more automobile systems may be generated at step 140.

In a step 150, the knowledge stream assembly module 130 collects procedure description information for use in creating knowledge streams. In one embodiment, a procedure description is linked to information regarding a specific system by identifying a procedure as applying to that system.

In one embodiment, the data that has been categorized as a procedure description may be further categorized. For example, as illustrated in FIG. 3, at a step 160, steps of a procedure are processed and at a step 170 reference information included in a procedure description is processed. In one embodiment, steps 160 and 170 categorize the entire procedure description, or portions of the description, as either steps to be performed in a repair or diagnostic procedure, or as reference information. Thus, the data that is categorized as a procedure description in step 150 may be split into more narrow categorizations. For example, one type of reference information may include probable cause information, such as a list of things that might have caused the condition that is being diagnosed. Another type of reference information may be Diagnostic Trouble Codes ("DTC"), which is information read from an automobile's computer.

Continuing to a step 180, data that is categorized and processed by the previous steps, is combined into knowledge streams. As noted above, a knowledge stream may include a procedure itself, along with steps of the procedure, and include links to reference information corresponding to specific steps, or corresponding to the entire procedure or the automobile in general.

In one embodiment, knowledge streams are organized in a hierarchical structure. For example, a top level of the hierarchy may identify the specific knowledge streams, as well as other information that may help to identify the knowledge stream, such as a type of the knowledge stream. In a next level of the hierarchy, a number of folders may be linked to each knowledge stream, where the folders contain the various content items associated with the knowledge stream. For example, a knowledge stream may contain individual steps in a process, pieces of reference information that are specific to a procedure, reference information for a system, and global reference information. Thus, by selecting a particular knowledge stream, various informational items may be easily retrieved by the user.

Figure 4:
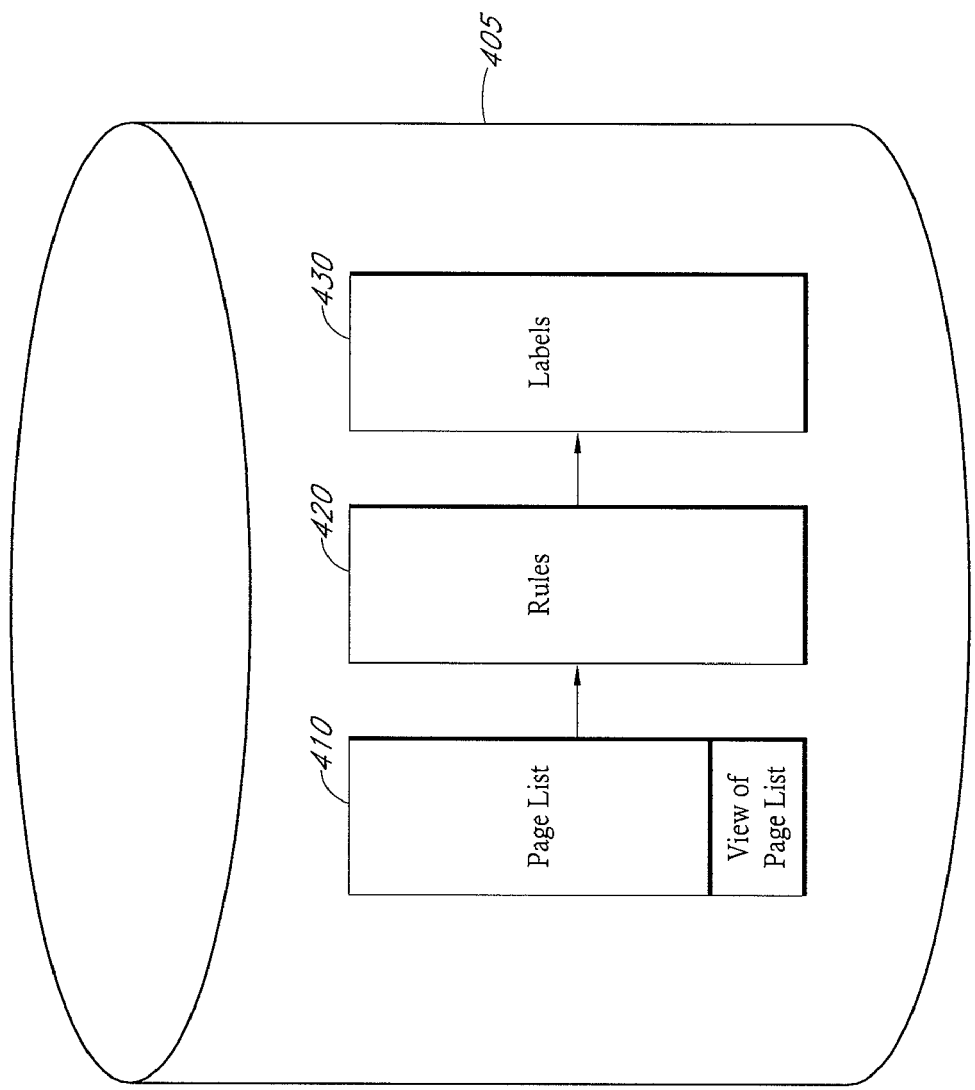
FIG. 4 is block diagram illustrating a data store configured so that labels may be more easily updated according to the rules.

FIG. 4 is block diagram illustrating a data store 405 configured so that labels may be more easily updated according to the rules. In the past, pages were typically associated directly with one or more labels for that page. However, if one of the rules responsible for applying a label to a page was changed so that a label for a page should be changed, there was no easy way to update labels based on the current rules. As shown in FIG. 4, the data store 405, which may be a data base, for example, stores a page list, rules associated with each page, and labels for each of the pages, as generated by the rules. In one embodiment, the page list includes an identifier for each page, where the actual pages are stored separately. The page references stored in the page index may be viewed according to one or more views, which may also be stored in the data store 405. Advantageously, rules are generated for classification of particular pages (listed in the page index) so that a page may be classified according to the generated rules. Because rules are generated and stored, rather than just the specific classifications for the pages, these rules may be applied to subsequent pages, thus reducing the effort required to classify subsequent pages. For example, related pages, such as pages of a specification manual for a different year of the same model automobile, may be classified using the same rules. Accordingly, rules may be generated once and applied multiple times to a collection of pages if necessary. This approach accommodates the need to regenerate the base data (as changes are made, etc.) without losing the labeling effort that has already been performed.

Figure 5:
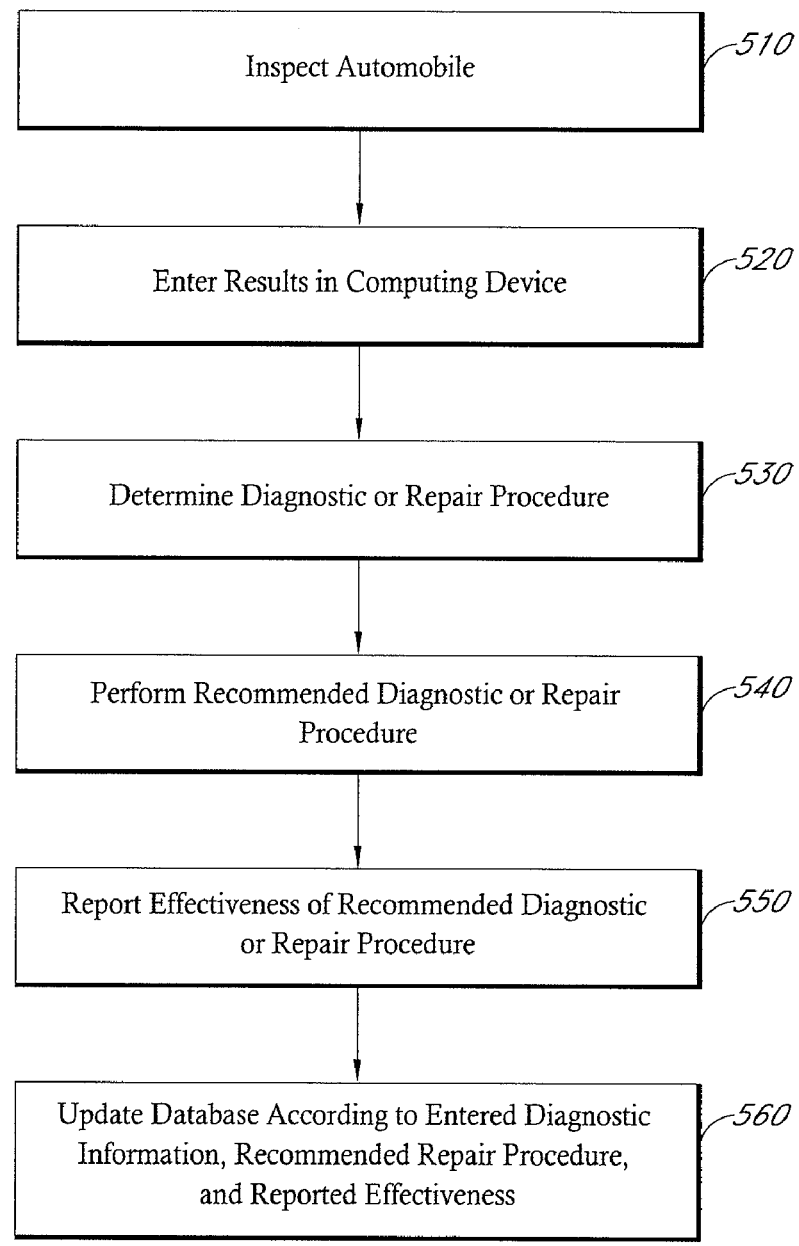
FIG. 5 is a flow chart illustrating a method of updating an automotive repair and/or diagnosis database with information regarding the usefulness of particular repairs and/or diagnosis procedures.

FIG. 5 is a flow chart illustrating a method of updating an automotive repair and/or diagnosis database with information regarding the usefulness of particular repairs and/or diagnosis procedures. More generally, the method illustrated in the flow chart of FIG. 5 may be applied to updating a database with information indicating the usefulness of particular informational items by users.

In block 510, a technician inspects an automobile. The technician may inspect various components of the vehicle based upon, for example, information provided by an owner of the vehicle or standard checkup items. The technician typically inspects at least one component of the automobile and records the status of that component. For purposes of illustration, FIG. 5 will be described with specific reference to inspection and diagnosis of automobile brakes. However, the systems and methods described herein are not only applicable to brake systems, but may be applied to any component that may be analyzed, diagnosed, and serviced. With reference to an exemplary automobile brake inspection, a technician may analyze and record brake fluid levels, brake pad thickness, and caliper wear, for example. The technician may then record observations relating to each of these items in various formats. For example, in one embodiment, the technician simply notes whether the item is within allowable specifications or if the item needs further diagnosis and/or repair. In another embodiment, the technician records more exact data for each item, such as an estimate of the brake fluid level and a thickness of the brake pads.

Moving to a block 520, the results of the inspection performed by the technician are entered into a computing device. The computing device may be one of many devices, but advantageously is a mobile device that is configured to communicate with a central computer. For example, in one embodiment a tablet computer or a personal digital assistant ("PDA") may be used by a technician to enter the inspection data. With respect to the above example of automobile brake inspection, the technician may enter one or more inspection results for each item inspected. For example, in one embodiment, the technician enters a thickness of brake pads, such as 2 mm. In another embodiment, the technician may simply note that the pads require repair and/or further diagnosis or that the pads are of an acceptable thickness.

After the inspection results are entered into the computing device, the results are advantageously transmitted to a central computer, typically having greater storage and processing capabilities than the computing device. Transmission of the results may be performed either via a wired or a wireless link and may be accomplished using any available communication protocol.

Next, at a block 530, one or more diagnostic and/or repair procedures are selected, based upon the inspection results and the acceptable specifications for the inspected items. In one embodiment, the central computer determines the one or more diagnostic and/or repair procedures that should be performed by the technician. In another embodiment, a mobile computing device that the technician uses to enter the inspection results may be configured to determine the one or more diagnostic and/or repair procedures. In any case, the one or more determined procedures are advantageously displayed to the technician on the computing device. In an advantageous embodiment, the displayed information includes specific steps to be performed in completing the one or more procedures. For example, if the central computer or the technician computing device determines that a brake pad is too thin, the determined procedure may be to replace the brake pad. Thus, the technician is informed of this diagnosis on the technician computing device. In addition, the technician may also be provided with specific steps to be performed in replacing the brake pad.

Moving to a block 540, the recommended procedure is performed by the technician. For example, the brake pad is replaced by following the procedure provided on the technician computing device.

Continuing to a block 550, an effectiveness of the performed procedure is reported. The effectiveness of some procedures may be determined by the technician immediately after performing the procedure, while the effectiveness of other procedures may not be determined until after the automobile has been returned to the owner and the vehicle has operated for a period of time. In either case, an effectiveness determination is entered into either the technician computing device, the central computer, or any other computing device that is in communication with the central computer. For example, if a particular procedure does not remedy the diagnosed symptom, a poor rating may be assigned to the procedure. Likewise, if a particular procedure does remedy the diagnosed symptom, an excellent rating may be assigned to the procedure. These ratings may be numerical, ranging from 1 to 10 or 1 to 100, for example, or composed of alphabetic ratings, such as A-F, for example. Any other rating system may also be used in conjunction with the described systems and methods.

Proceeding to a block 560, the effectiveness of the performed procedure is recorded in a database. In an advantageous embodiment, the diagnosis for which the procedure was recommended is also recorded in the database. The central computer, or other computing device, may then analyze the effectiveness of the recommended procedure with respect to the diagnosis that caused the procedure to be recommended. If multiple procedures have been performed in response to the same or similar symptoms, the central computer may then determine which procedures are the most effective for remedying the symptoms. In this way, the effectiveness of multiple procedures for treating a diagnosed symptom may be rated. Thereafter, the database that stores recommended procedures linked to diagnoses may be updated so that the most effective procedure for each diagnosed symptom is provided to the technician as the most effective procedure. In one embodiment, the technician is provided with multiple choices for procedures to perform in response to a diagnosis. For example, the technician computing device may list up to three procedures that have the highest effectiveness rating for a diagnosed symptom. The technician may then have the opportunity to select one of the procedures and, in response to the selection, may be presented with a knowledge stream for the selected procedure, or a list of steps to perform in completing the procedure.

Figure 6:
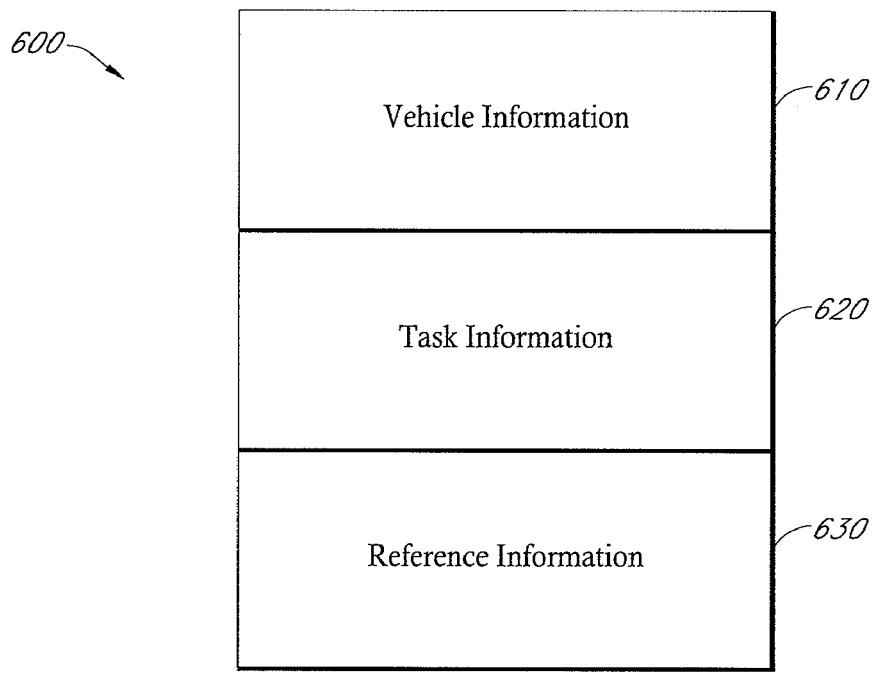
FIG. 6 is a simplified diagram illustrating an exemplary configuration of information in a graphical user interface ("GUI").

FIG. 6 is a simplified diagram illustrating an exemplary configuration of information in a graphical user interface ("GUI") 600. While the configuration of information illustrated in FIG. 6 may be used for display of information related to any object, the GUI 600 illustrates information related to a vehicle, such as an automobile. The exemplary GUI 600 includes a vehicle information pane 610, task information pane 620, and reference information pane 630. The arrangement of information as illustrated in FIG. 6 advantageously provides a viewer with various types of information that are each related to a particular task. For ease of description, FIG. 6 is described below with specific reference to display of information related to vehicles. However, the display configuration and methods for displays discussed herein are expressly contemplated for use with information related to any object.

The vehicle information pane 610 contains information regarding a particular vehicle that is being diagnosed, repaired, and/or otherwise inspected. For example, the vehicle information pane may contain a make, model, year, and options of an automobile. The vehicle information pane 610 may further include customer information, such as address, phone number, and prior repair orders and invoices. Thus, a user viewing the GUI 600 may view many types of information regarding the vehicle under inspection.

The task information pane 620 contains information regarding a particular task (referred to herein also as a procedure) that may be performed on the vehicle indicated in the vehicle information pane 610. The procedures that may be displayed in the task information pane 620 include, for example, diagnostic and repair procedures. Thus, the task information pane 620 may include multiple steps that may be performed in diagnosing a symptom and may later display multiple steps in repairing a particular diagnosed symptom. For example, if a user is an automobile repair technician, the task information pane 620 may include steps for diagnosing a problem with an automobile's brake system. The steps may be divided into several sub steps, or categories, that may be iteratively displayed in the task information pane 620.

The reference information pane 630 contains various types of reference information, from various reference sources, that is related to the currently displayed task information for the vehicle indicated in the vehicle information pane 610. For example, if the task information pane 620 includes a diagnostic procedure for checking a leaking dump valve of an automobile, the reference information pane 630 may display reference information indicating the proper method for removal and installation of a hydraulic control unit. As another example, if a repair procedure is displayed in the task information pane 620, the reference information pane 630 may display items such as wiring diagram or special tool information that may be useful for completion of the indicated task.

In one embodiment, the task information pane 620 includes one or more buttons or tabs that may be selected in order to display particular reference information in the reference information pane 630. In particular, a button or tab may be labeled to indicate a type of reference information that is available for viewing, such as symptom help, components/tools, system info, and general info. Thus, the user may determine which type of reference information may be most useful in completing the task and may select one or more of the types of reference information available with respect to a particular task. Because every technician has unique training and experience, not every technician requires the same reference information. Accordingly, the buttons and/or tabs located in the task information pane 620 advantageously allow each technician to determine which types of reference information they would like to view in order to more efficiently complete the task.

The configuration of information as shown in exemplary FIG. 6 provides information that typically may only be found in multiple information sources. For example, a typical automobile repair shop may use a specification manual for a certain make and model of automobile in order to diagnose symptoms of a subject automobile. During the diagnosis, certain reference information, such as the location of particular electrical components, the manufacturer's suggested torque settings, or instructions for using a particular tool referred to in the diagnosis procedure, may not be located on the same page as the diagnosis procedure. In fact, the reference information may be in another book or another section of the specification manual. In either case, additional effort and time is required for the technician to locate the proper reference information. As illustrated in FIG. 6, the relevant reference information, of any type, is advantageously displayed next to the procedure steps. In an advantageous embodiment, the reference information is automatically updated as the information in the task information pane 620 is changed. Accordingly, a technician viewing the GUI 600 does not need to access any other reference information, valuable man hours are spared, and efficiency increases.

In addition to reducing effort and time required to locate relevant reference information, the layout and immediate availability of relevant reference information may also increase the learning capabilities of the viewing technician. In particular, because the technician is not required to shift their mental focus from the task indicated in the task information pane 620 to the more menial task of locating reference information that may be helpful or required to complete the task, the technician is more likely to understand and retain the task information and the related reference information. In this way, the layout of information as illustrated in FIG. 6 may increase employee productivity by increasing employee learning capacity.

Figure 7:
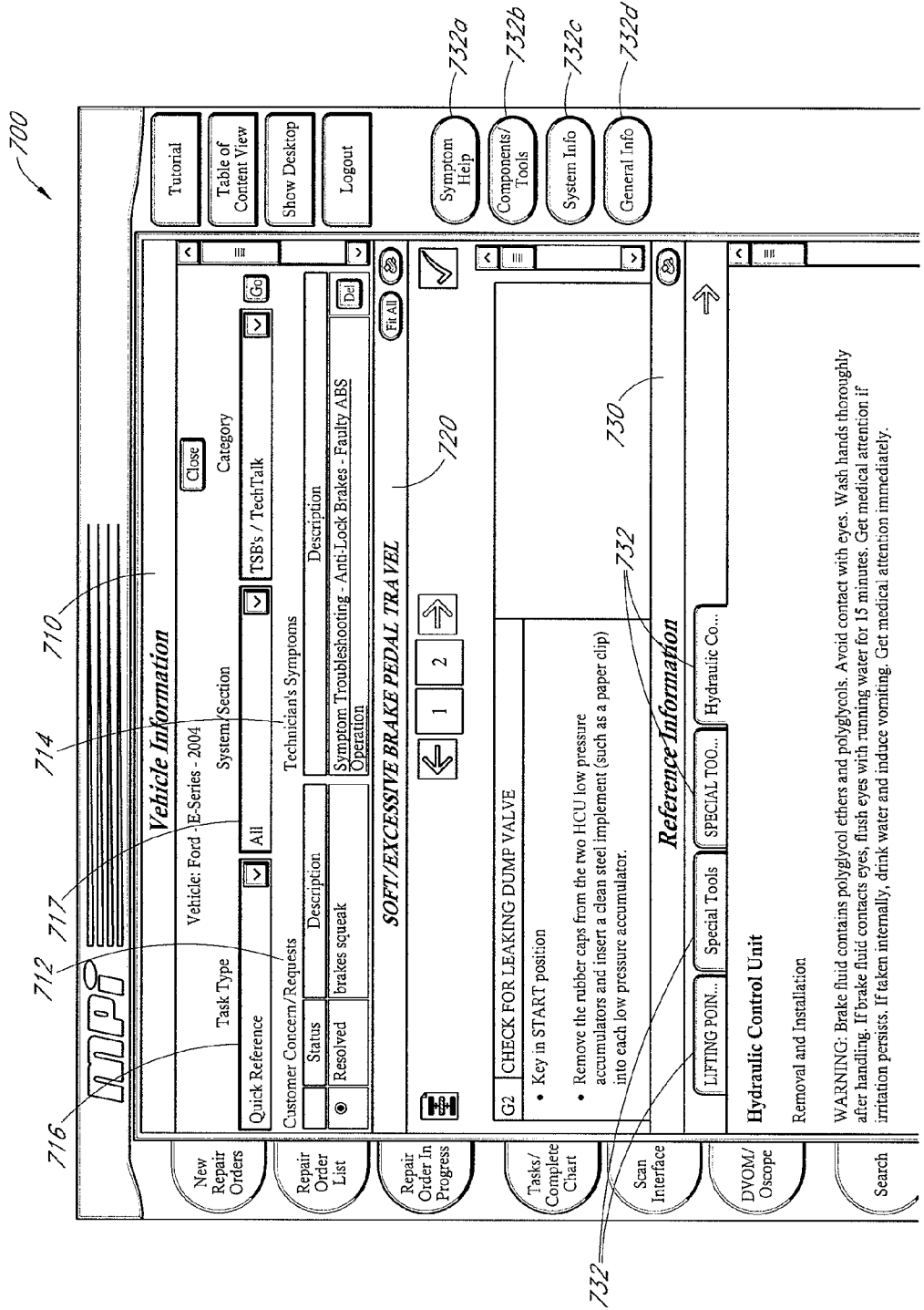
FIG. 7 is an exemplary GUI including the configuration of panes as discussed above with respect to FIG. 6.

FIG. 7 is an exemplary GUI 700 including the configuration of panes as discussed above with respect to FIG. 6. In particular, FIG. 7 includes a vehicle information pane 710 a task information pane 720 and a reference information pane 730. In the exemplary GUI 700, the vehicle information pane indicates that the information in the vehicle information pane 710, the task information pane 720, and the reference information pane 730 is related to a Ford E-series 2004 vehicle. The vehicle information pane 710 also includes a customer concerns/request portion 712, wherein a customer's concerns, along with the status of resolving each concern, may be tracked. A technician's symptoms portion 714 is linked to the customer concerns/request portion 712 and includes a technician's notes related to the particular customer concern.

A task type menu 716 lists one or more tasks that may be selected for display in the task information pane 720. In one embodiment, the available tasks listed in the task type menu 716 include DTC troubleshooting; symptom troubleshooting; remove, replace, install, and repair; service, adjust and clean; and test, check and inspect. In other embodiments, additional types of tasks may be included and the task types may be further divided into more task types.

A system menu 717 lists one or more systems, or subsystems, of the vehicle on which the task selected in the task type menu 716 may be performed. For example, if the symptom troubleshooting task is selected in the task type menu 716, the system menu 717 may list vehicle systems on which knowledge streams for symptom troubleshooting are available. These systems may include, for example, exhaust system, support system, engine, steering system, power train, electrical system, coolant system, fuel system, and brake system. In one embodiment, the system menu 717 may also include subsystems, such as, muffler, tailpipe, fuel tank, shock absorbers, coil springs, drum brake, fuel line, accelerator, brake pedal, distributor, differential, master break cylinder, disk brake, transmission, spark plug wires, exhaust manifold, engine, radiator, alternator, coolant reservoir, intake manifold, batteries, break line, and steering wheel.

In one embodiment, the system menu 717 is populated with selectable items in response to the selection of a task type from the task type menu 716. Thus, for each task type there may be different systems that are displayed in the system menu 717. In one embodiment, the systems that are displayed in the system menu 717 are those systems for which task information is available on the currently selected vehicle. For example, in the embodiment of FIG. 7, a Ford E-Series 2004 vehicle is selected. If a remove, replace install and repair task type is selected in the task type menu 716, the system menu 717 may display, among other systems, manual transmission and automatic transmission. However, if another vehicle is selected that is not available with a manual transmission, the system menu 717 may not display manual transmission as a selection option. In another embodiment, the systems displayed in the system menu 717 for a selected task type are the same for any vehicle, but only certain systems are selectable by a user.

In the embodiment of FIG. 7, the task information pane 720 includes information for repairing soft/excessive brake pedal travel. In one embodiment, the specific task display in the task information pane 720, e.g., "soft/excessive brake pedal travel . . . " is selected from a list of one or more tasks related to the selected task type and the selected system. As illustrated in FIG. 7, a first procedure in this particular task is titled "Check for leaking dump valve." One of the steps in this procedure includes, "Remove the rubber caps from the two HCU low pressure accumulators." In an advantageous embodiment, as a result of having selected a specific task, the reference information pane 730 displays relevant reference information. For example, in the illustration of FIG. 7, the reference information pane displays information regarding the removal and installation of a Hydraulic Control Unit.

As shown in FIG. 7, the reference information pane 730 includes multiple tabs 732A-732D, which may be selected in order to change the type of reference information displayed. For example, if the user selects the components/tools tab 732B, the reference information pane 730 will be updated with information regarding special tools that are relevant to the procedure for repairing soft/excessive brake pedal travel. In one embodiment, the reference information tabs 732 may be automatically updated, or added to, based upon the information displayed in the vehicle pane 720 and/or the task information pane 720. For example, various steps of a task that are displayed in the task information pane 720 may have specific reference information that is relevant to the particular step. Accordingly, as the information in the task information pane 720 changes, such as by moving from one step to another in a procedure, the reference information tabs 732 may be automatically updated to include additional tabs corresponding to relevant reference information. The tabs 732 may then be selected in order to display the corresponding reference information in the reference information pane 730.

Figure 8:
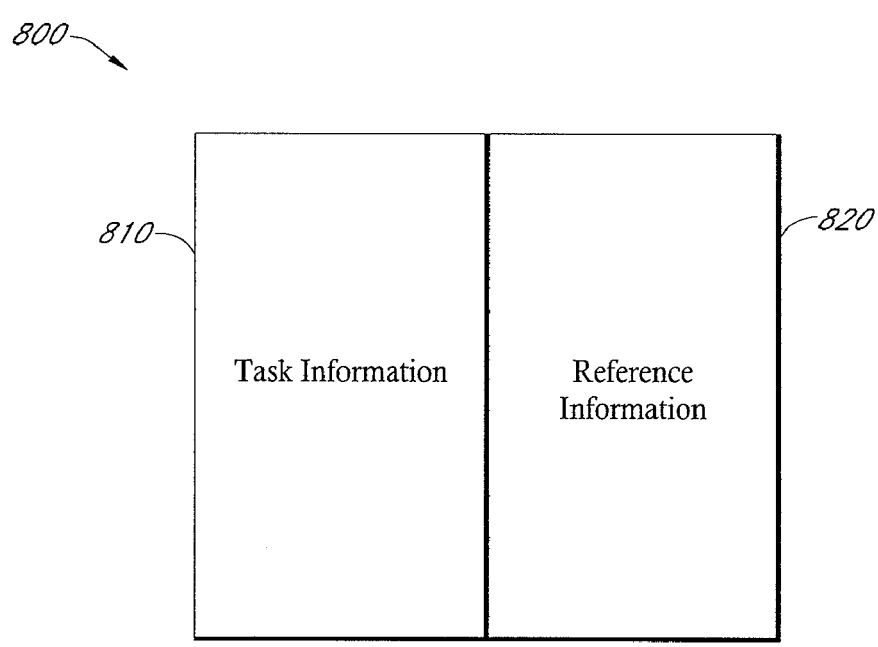
FIG. 8 is a simplified diagram illustrating an exemplary configuration of information in a GUI.

FIG. 8 is a simplified diagram illustrating an exemplary configuration of information in a GUI 800. While the configuration of information illustrated in FIG. 8 may be used for display of information related to any object, the GUI 800 illustrates information related to a vehicle, such as an automobile. In the embodiment of FIG. 8, a task information pane 810 is located next to a reference information pane 820. The GUI 800 does not include a separate pane for vehicle information. However, in one embodiment, the vehicle information may be displayed in a separate window, or in either the task information pane 810 or reference information pane 820 when selected. For example, the vehicle information may be displayed on a display device as an alternate to display of the task information pane 810 and the reference information pane 820 as shown in FIG. 8.

Similar to the embodiments discussed above, the GUI 800 updates the reference information according to the currently displayed task information. Accordingly, the user is provided with reference information that may otherwise only be found in multiple separate reference manuals. Because the relevant reference information is easily available to the user, the user's focus on the displayed task is maintained and the user's comprehension of the task may be enhanced.

Figure 9:
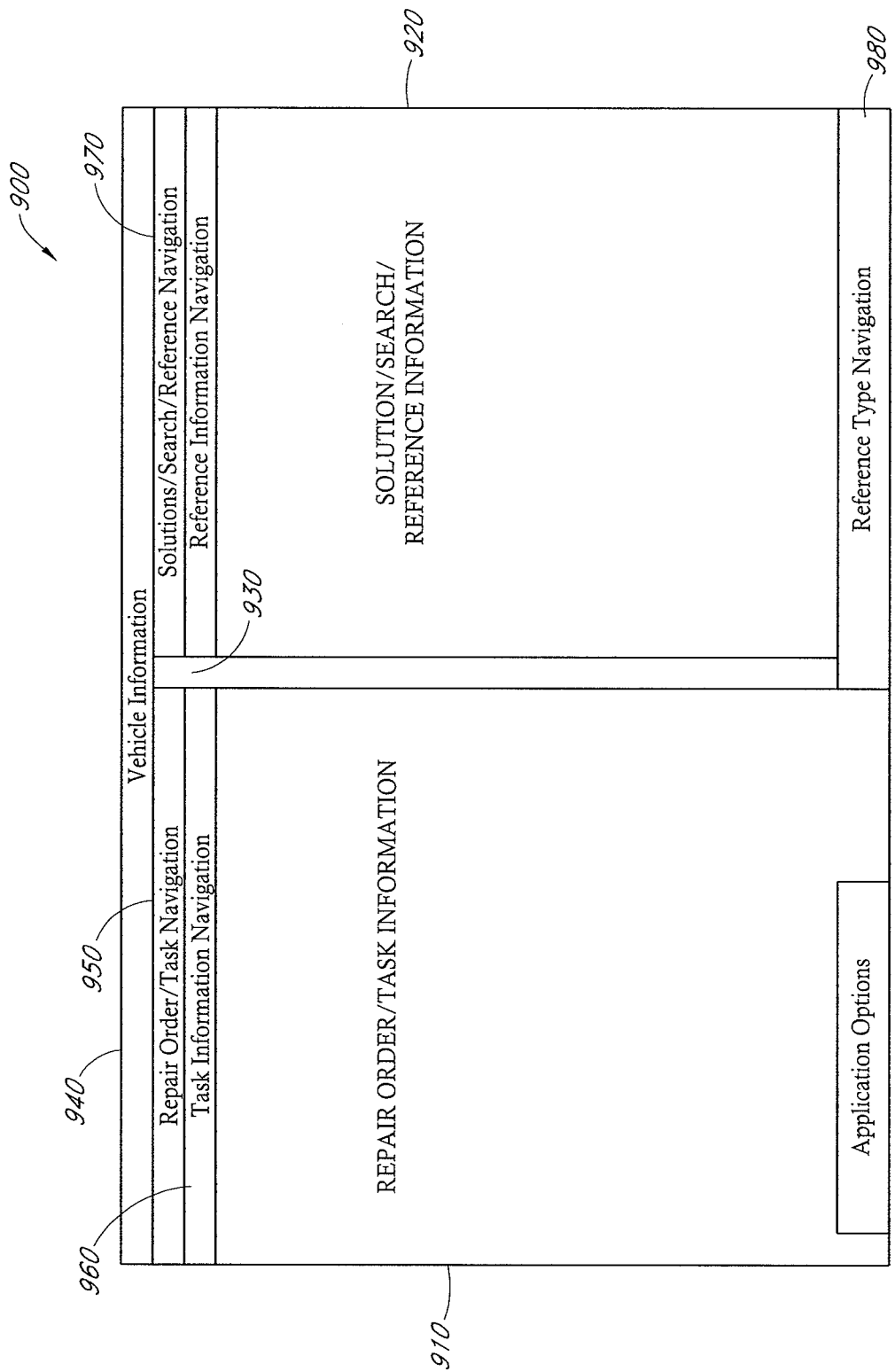
FIG. 9 is a simplified diagram of a GUI including two primary panes, specifically, a repair order/task information pane and a solution/search/reference information pane.

FIG. 9 is a simplified diagram of a GUI 900 including two primary panes, specifically, a repair order/task information pane 910 (also referred to herein as a task information pane) and a solution/search/reference information pane 920 (also referred to herein as a reference information pane). In the embodiment of FIG. 9, the two primary panes are divided by an adjustable divider 930 that may be moved in either direction to change the sizes of the primary panes.

Figure 10A:
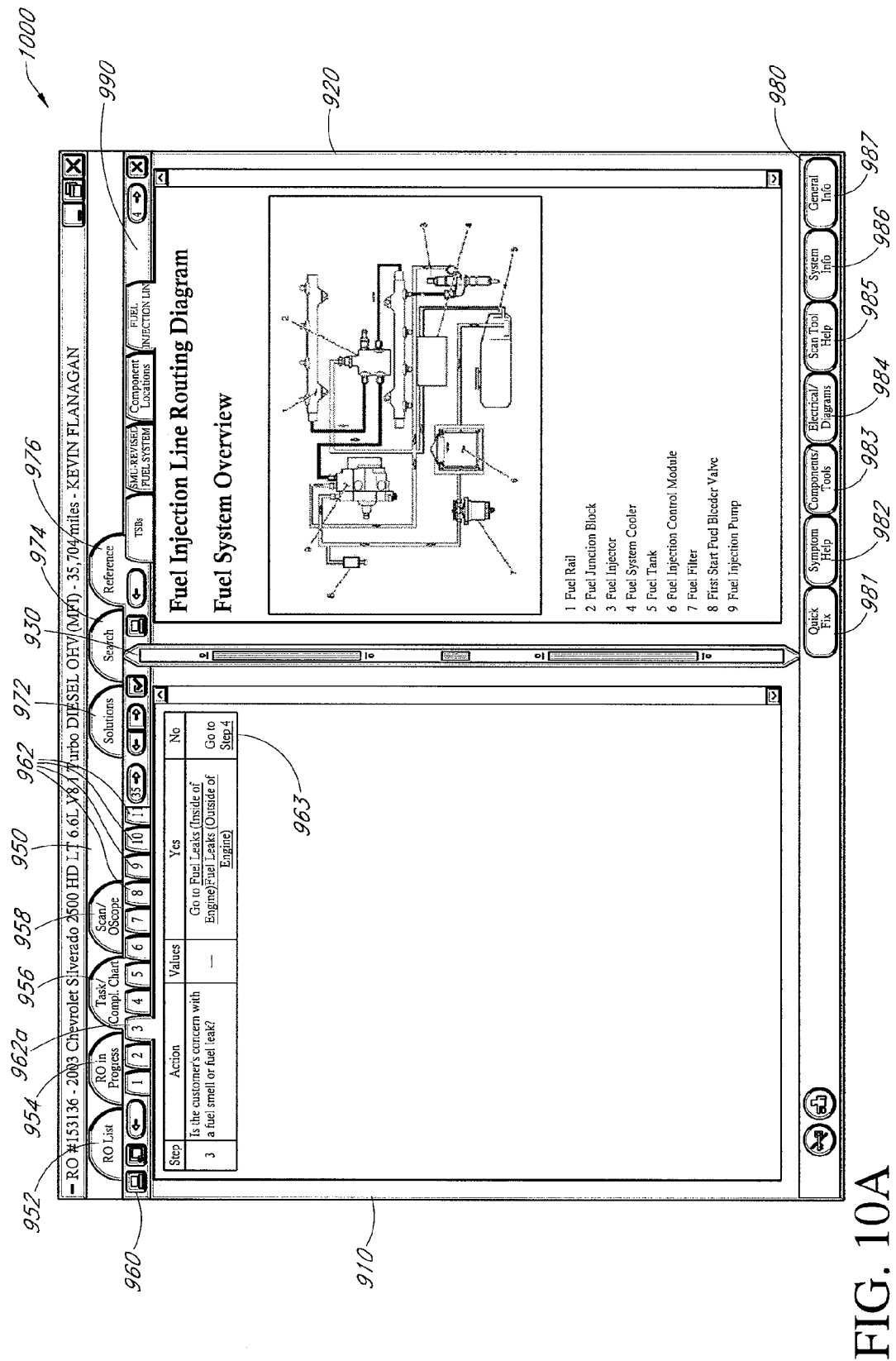
FIG. 10A is an exemplary GUI that is configured similar to the layout of the simplified GUI of FIG. 9.

FIG. 10A is an exemplary GUI 1000 that is configured similar to the layout of simplified GUI 900. For ease of illustration, FIGS. 9 and 10A will be described together below. As shown in FIG. 10A, the GUI 1000 includes a task information pane 910, a reference information pane 920, and adjustable divider 930 in the same orientation as FIG. 9.

Figure 10B:
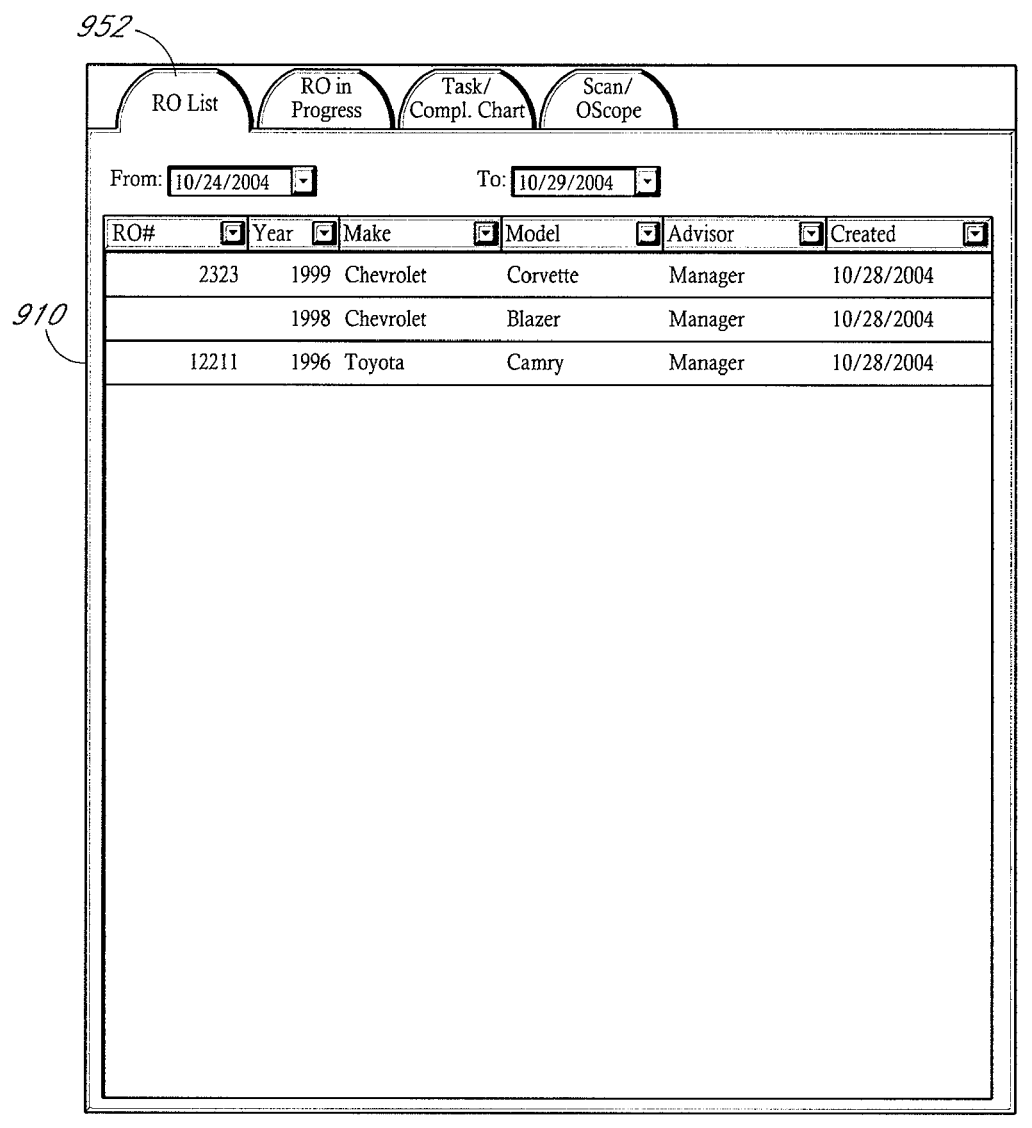
Figure 10C:
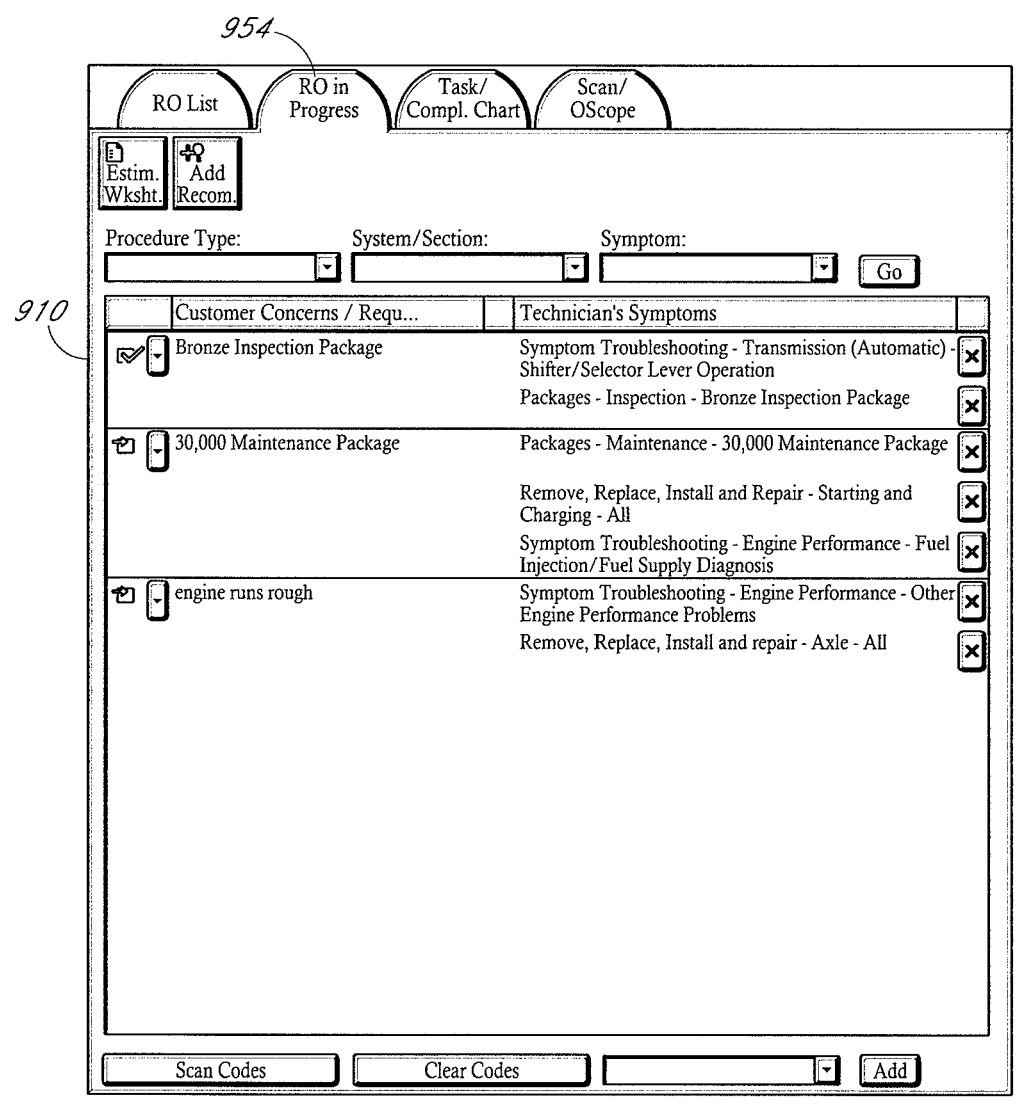
Figure 10D:
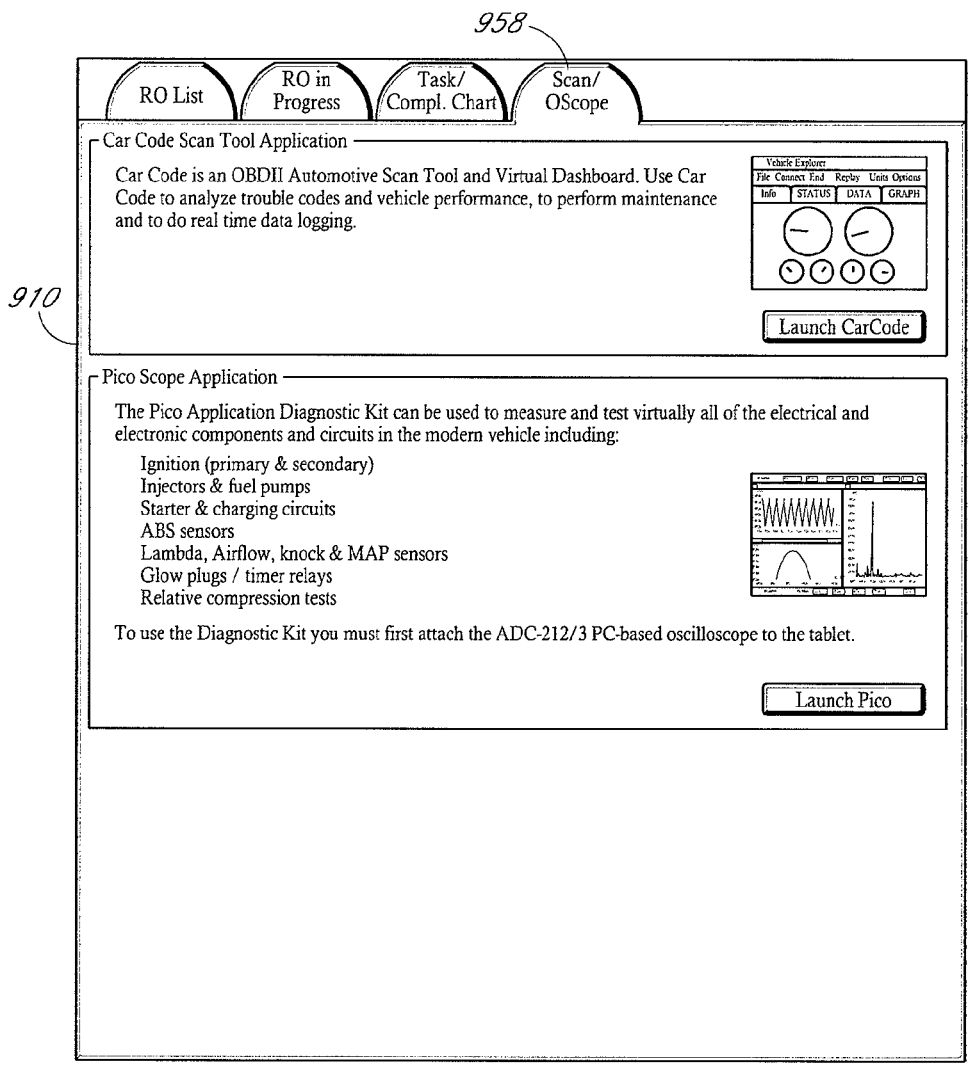
FIG. 10D is a partial screen shot illustrating the task information pane when the Scan/Oscope tab is selected.

Referring to both FIGS. 9 and 10A, a repair order/task navigation pane 950 may include one or more tabs, buttons, or other selection indicator, related to repair orders, tasks, and diagnostic information from a scanning device, such as a PicoScope. The navigation pane 950 may include other tabs that may be selected in order to display various types of information in the task information pane 910. With reference to FIG. 10A, the repair order/task navigation pane 950 includes a repair order ("RO") list tab 952, an RO in progress tab 954, a task/completion chart tab 956, and a scan/oscilloscope (Oscope) tab 958. In the embodiment of FIG. 10A, each of the tabs 952, 954, 956, and 958 initiate display of different types of information in the task information pane 910. For example, in the specific illustration of FIG. 10A, the task/completion chart tab 956 is selected. Accordingly, task information is displayed in the task information pane 910. However, if RO list tab 952 is selected, the task information pane 910 will display a list of one or more repair orders that have been entered into the database. FIG. 10B is a partial screen shot illustrating the task information pane 910 when the RO list tab 952 is selected. If RO in progress tab 954 is selected, the task information pane 910 will display a list of one or more customer concerns/requests, along with corresponding technician's symptoms for each concern/request. FIG. 10C is a partial screen shot illustrating the task information pane 910 when the RO in progress tab 954 is selected. Finally, if the Scan/Oscope tab 958 is selected, the task information pane 910 displays information regarding available diagnostic tests. FIG. 10D is a partial screen shot illustrating the task information pane 910 when the Scan/Oscope tab 958 is selected. As shown in exemplary FIG. 10D, two diagnostic tests, a car code scan tool application and a PicoScope application, are available for use.

Referring again to FIGS. 9 and 10A, a task information navigation pane 960 includes tabs, buttons, or other navigation indicators, allowing the user to navigate task information displayed in the task information pane 910. As illustrated in FIG. 10A, the task information navigation pane 960 includes several groups of selectable buttons. Notably, the task information navigation pane 960 includes multiple task step tabs 962. In the embodiment of FIG. 10, task step tabs the labeled 1-11 are illustrated. The task step tab 962A corresponding to a task step tab 3, is selected in the GUI 1000. Accordingly, the task information pane 910 displays information regarding a third step in the selected task. The user may jump to any numbered step in the task by selecting the corresponding task step tab 962.

Figure 10E:
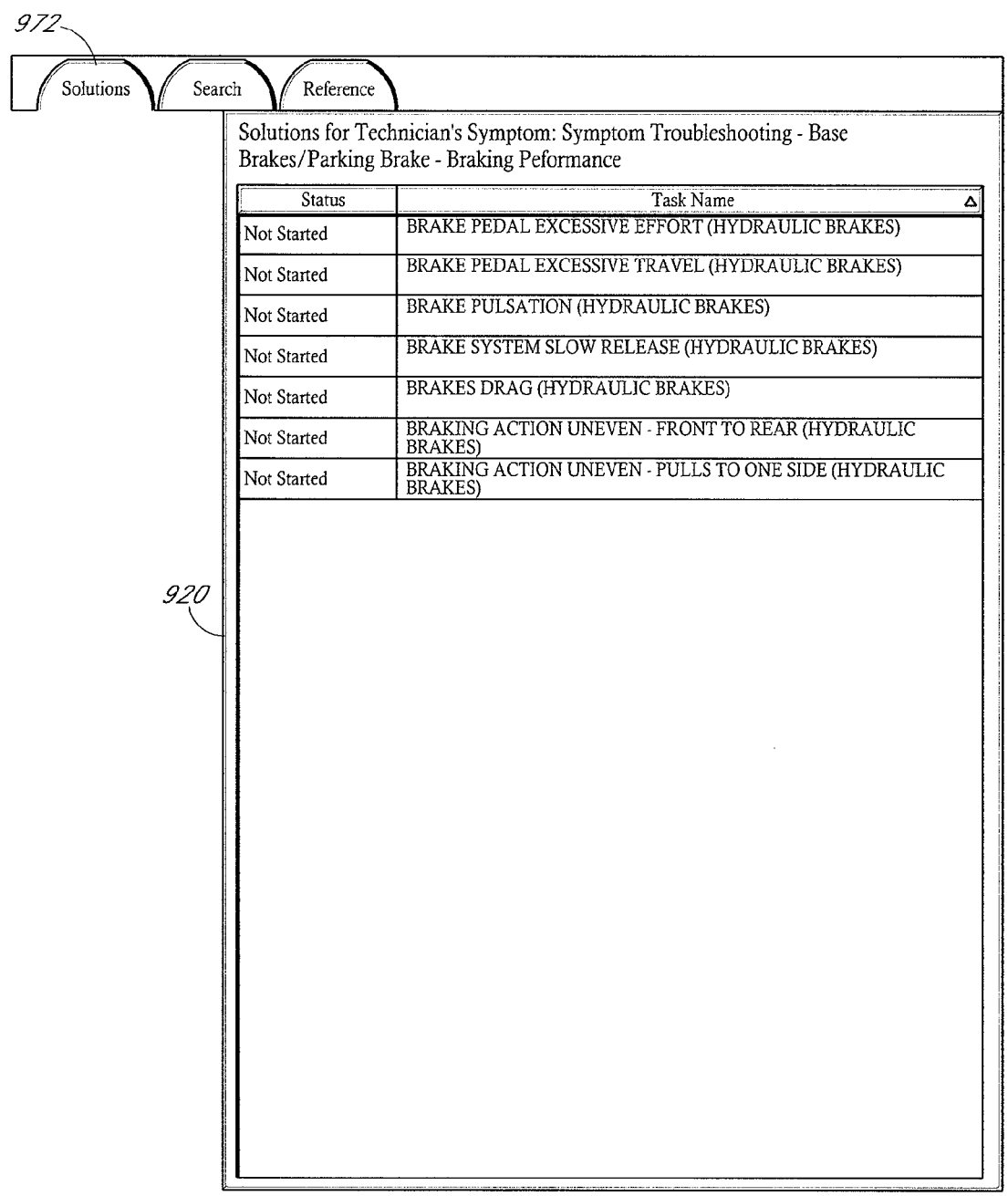
FIG. 10E is a partial screen shot illustrating an exemplary display of the reference information pane when the solutions button is selected.

Referring again to FIGS. 9 and 10A, a solution/search/reference navigation pane 970 includes one or more tabs, buttons, or other selectable indicators that allow the user to select a type of information for display in the solution/search/reference information pane 920. With reference to FIG. 10A, this pane includes a solutions button 972, a search button 974, and a reference button 976. In one embodiment, the solutions button 972 selects for display in the reference information pane 920, a list of possible tasks that may be performed on the selected vehicle for the selected symptoms. FIG. 10E is a partial screen shot illustrating an exemplary display of the reference information pane 920 when the solutions button 972 is selected. In one embodiment, the search button 974 selects for display in the reference information pane 920 one or more search fields that may be used to search the database of procedures. FIG. 10F is a partial screen shot illustrating an exemplary reference information pane 920 when the search button 974 is selected.

Referring again to FIG. 10A, when a reference button 976 is selected, information related to one of multiple types of reference information is displayed in the reference information pane 920. In one embodiment, the reference type navigation pane 980 indicates the type of reference information displayed in the reference information pane 920 when the reference button 976 is selected. With specific reference to exemplary FIG. 10A, reference button 976 is selected and a task is selected for identifying fluid leaks. Accordingly, the software application locates reference information related to the task of identifying fluid leaks, which includes a fuel injection line routing diagram, such as displayed in FIG. 10A. In one embodiment, the diagram displayed in the reference information pane 920 of FIG. 10A may be selected for display by selecting an electrical/diagrams button 984 from the reference type navigation pane 980. If other types of reference information are desired, the other reference type navigation buttons 981 - 987 may be selected. In one embodiment, if no reference information of the type selected in the reference type navigation pane 980 is available, the particular reference type navigation button will not be selectable by the user. Advantageously, the reference information displayed in the reference information pane 920, of any type available, relates to the current task information displayed in the task information pane 910. Accordingly, the user may more easily visualize the procedures necessary to complete a task using all available reference information.

Figure 11:
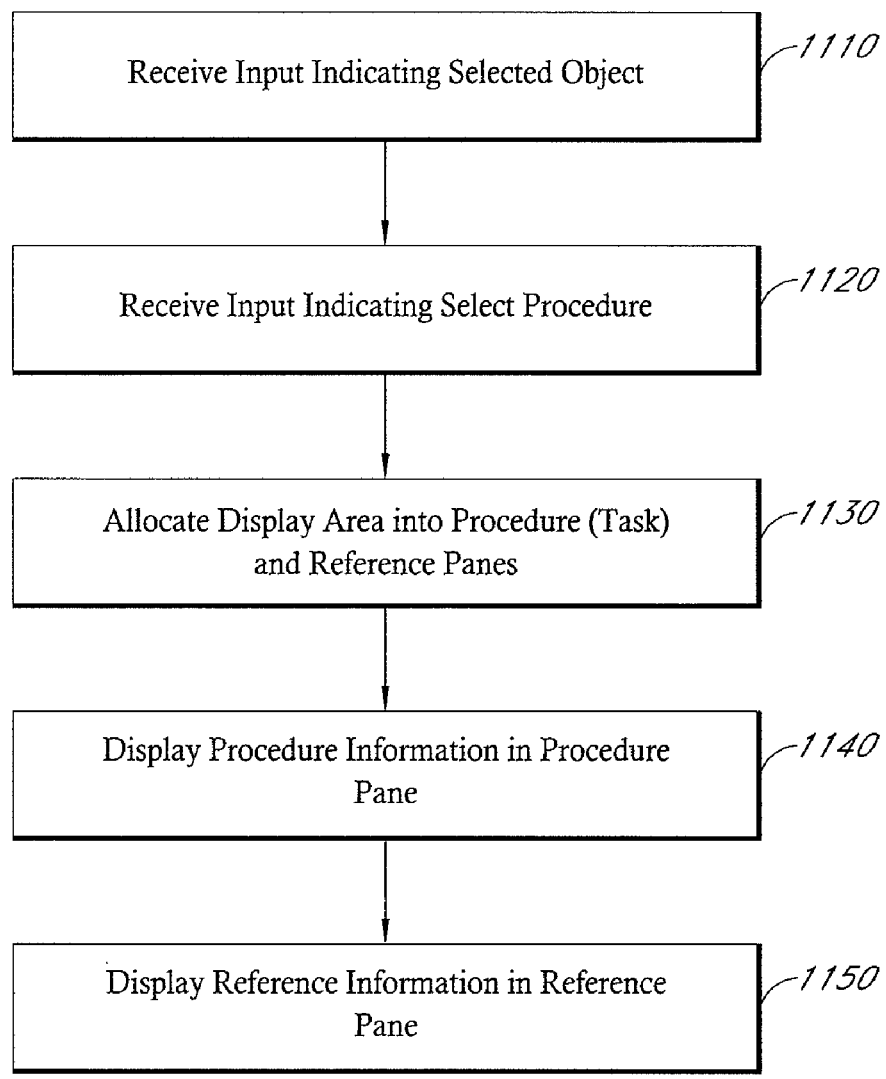
FIG. 11 is a flowchart illustrating an exemplary method of selecting information for display, and displaying the selected information, on a display device.

FIG. 11 is a flowchart illustrating an exemplary method of selecting information for display, and displaying the selected information, on a display device. In one embodiment, the method of FIG. 11 is performed by a computer system 200 (FIG. 2) located at an automobile repair shop. In an advantageous embodiment, the computer system 200 includes the portable computing device 250 that is wirelessly coupled to the computer 220. In this embodiment, the portable computing device includes a display on which the procedure and reference information is displayed. Alternatively, the method of FIG. 11 may be performed by the document manager 115 or any other computing device that has access to the information generated by the document manager 115. For ease of description, exemplary FIG. 11 is described as performed by a computer system 200 located at an automobile repair shop, wherein the task and reference pane are displayed on a portable computing device 250 that is in communication with the computer 220. In this embodiment, the completion of the various method steps may be performed solely by the portable computing device, the computer 210, or by a combination of the portable computing device 250 and the computer 210. Those of skill in the art will also recognize that the method may be performed by other computing devices or combinations of computing devices.

Starting at a block 1110, an input is received indicating a selected object. As noted above, the object may be any object on which procedures, such as diagnostic or repair procedures, may be performed. In an exemplary embodiment, the object comprises a vehicle. In one embodiment, a user selects a particular make, model, and year of an automobile using an input device, such as a keyboard 230 and/or a mouse 240 that is coupled to the computer 220. In another embodiment, the user enters information into the portable computing device 250 using a stylus, keypad, keyboard, or microphone of the portable computing device. For example, the user may select a 1998 Ford Mustang by navigating one or more pull-down menus displayed on the portable computing device 250. Alternatively, the input device may be an on-board diagnostic (OBD) system scanning tool connected to an OBD connector of an automobile. In this embodiment, the OBD system scanning tool may determine the make, model, and year of the automobile and provide this data to the computer system 200 via the portable computing device 250, for example.

Moving to a block 1120, an input is received at the portable computing device 250 indicating a procedure that has been selected. In one embodiment, the procedure is automatically selected based on information received from an OBD connector of the selected vehicle. In another embodiment, a procedure, such as a diagnostic or repair procedure is selected by the user based on one or more symptoms of the vehicle. In one embodiment, the user of the computer system 200, such as an automobile technician, enters one or more symptoms of the automobile into the portable computing device 250 that is wirelessly coupled to the computer system 200 and the computer system 200 determines one or more procedures that may be performed on the automobile. Alternatively, this determination may be performed entirely by the portable computing device. The user may then select a specific procedure from the recommended procedures that are selected by one or more devices of the computer system 200.

Continuing to a block 1130, a display area of the display device, such as an LCD screen of the portable computing device 250, is allocated for concurrent display of the task pane and the reference pane. For example, the portable computing device 250 that is carried by the automobile technician may be horizontally divided into two panes, such as is illustrated in FIG. 10A. The area of the panes may be automatically adjusted by the computing device that is displaying the panes or, alternatively, may be manually adjusted by the user of the portable computing device 250. In one embodiment, the panes may be displayed on any other computing device, such as the display device 210.

Next, in a block 1140 the portable computing device 250 displays procedure information in the procedure pane (which is synonymous with task pane). For example, FIG. 10A illustrates a task pane 910 that displays a task step and multiple task step tabs 962. As explained above, the task pane 910 displays information regarding a particular procedure that may be performed on the automobile. The user may move from one task step to another by selecting a corresponding task step tab 962. Alternatively, the user may jump to a next step by selecting a next step link 963, such as the next step link 963 labeled "Go to Step 4" in FIG. 10A. In one embodiment, the next step link 963 is included as a portion of the task step information. In one embodiment, a particular task step may include more than one next step link 963 for selection by a user. Using the methods described above, the user may navigate between multiple task steps in various manners.

Proceeding to a block 1150, the portable computing device 250 displays reference information in the reference pane, such as the reference pane 920 of FIG. 10A. As explained above, the reference pane 920 displays information that is related to the information currently displayed in the task pane 910 and the selected vehicle. Thus, the reference information contains information that may be useful to the technician in completing the selected procedure. The reference information may include information regarding symptoms, components, tools, system info, and general info, for example. In one embodiment, the user may select from multiple reference information items that are related to the current procedure and/or task step. Accordingly, the user may determine which type of reference information may be most useful in completing the task and may select one or more of the types of reference information available with respect to a particular task. Because every technician has unique training and experience, not every technician requires the same reference information. Accordingly, the buttons and/or tabs located in the reference pane 920 advantageously allow each technician to determine which types of reference information they would like to view in order to more efficiently complete the task. In one embodiment, the reference pane 920 includes a toolbar 990 that displays reference information tabs 992 that are currently available for selection by the user. Any of these tabs 992 may be selected by the user in order to change the display of reference information in the reference pane 920. In another embodiment, the toolbar 990 also includes a history of the reference information that has previously been displayed. As illustrated in FIG. 10A, for example, reference information related to "FUEL INJECTION LINE" is currently displayed in the reference pane, while reference information tabs 992 correspond to "Component Locations", "SMU-REVISED FUEL SYSTEM"," and "TSBs"reference information. These additional reference information tabs 992 may correspond to reference information that has previously been displayed in the reference pane 920 and/or the tabs 992 may correspond to additional reference information that is related to the information currently displayed in the task pane 910. Thus, the user may easily re-display a reference information item that has already been viewed by clicking on the appropriate tab 992 in the toolbar 990.

By displaying task and reference information as described above, the graphical user interface displays information that may reduce the time required to perform a selected procedure. For example, the automatic display of reference information related to the specific procedure or sub-procedure that is currently displayed in the task pane reduces the need for the technician to locate the reference information in another source. In addition, the display of reference information that is related to the information in the task pane reduces the need for the technician to memorize or otherwise become familiar with the reference information. Much of the reference information may be information that is infrequently used by the technician and, thus, requiring the technician to commit the reference information to memory or locate the reference information in one or more reference materials may reduce the efficiency and increase the time required to complete the procedure.

Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out the fundamental novel features of the invention as applied to various embodiments, it will be understood that various omissions, substitutions, and changes in the form and details of the components illustrated may be made by those skilled in the art, without departing from the spirit or essential characteristics of the invention.

What is claimed is:

1. A computer readable medium having a computer executable program executing on a computing device, wherein the computer executable program is configured to generate, on a display device, a graphical user interface including information related to a vehicle, wherein the graphical user interface comprises:

a procedure pane including procedure information, wherein the procedure information comprises a plurality of sub-procedures describing respective steps of the procedure, and the computer executable program is configured to display one of the plurality of sub-procedures in the procedure pane in response to communication with an input device of the computing device;

a reference pane including selectable reference information tabs, each of the reference information tabs being related to the displayed one of the plurality of sub-procedures, wherein the reference information tabs are updated in response to changing which of the one of the plurality of sub-procedures is displayed, the reference pane configured to display reference information from a plurality of separate information sources and from a plurality of locations within a single information source, the plurality of separate information sources comprising vehicle specification manuals and Internet reference materials and the single information source comprising a vehicle specification manual;

a plurality of sub-procedure tabs associated with the procedure pane such that each of the plurality of sub-procedure tabs relates to at least one of the plurality of sub-procedures of the procedure pane, the plurality of sub-procedure tabs configured to initiate change of the sub-procedure displayed in the procedure pane when one of the plurality of sub-procedure tabs is selected by the input device of the computing device, wherein the information displayed in the reference pane is automatically updated in response to a change in the sub-procedure displayed in the procedure pane through selection of at least one of the plurality of sub-procedure tabs, the information displayed in the reference pane being related to the sub-procedure displayed in the procedure pane; and one or more sub-procedure links embedded in the sub-procedure displayed in the procedure pane, wherein the one or more sub-procedure links are configured to initiate change of the sub-procedure displayed in the procedure pane when one of the one or more sub-procedure links is selected by the input device of the computing device, wherein the information displayed in the procedure pane is automatically updated through selection of at least one of the one or more sub-procedure links and the information displayed in the reference pane is updated in response to updating of the sub-procedure displayed in the procedure pane;

wherein the procedure information is selected from a list comprising a plurality of ranked procedures, the plurality of ranked procedures being related to respective vehicle symptoms and ranked according to information received from one or more vehicle service centers based on the effectiveness of the respective procedures in reducing the vehicle symptom.

2. The computer readable medium of claim 1, wherein the reference information displayed in the reference pane is updated in response to selection of one of the selectable reference information tabs, each of the reference information tabs being associated with different reference information.

3. The computer readable medium of claim 1, wherein the computing device comprises a portable computing device such that the graphical user interface is displayed on a display device of the portable computing device wirelessly coupled to a computing system.

4. The computer readable medium of claim 1, wherein the procedure information is selected from the group comprising: an inspection procedure, a diagnostic procedure, and a repair procedure.

5. The computer readable medium of claim 1, wherein the information displayed in the procedure pane comprises a plurality of colunms displaying procedure information and a single row corresponding to a particular sub-procedure.

6. The computer readable medium of claim 5, wherein the plurality of columns comprises a first column comprising a step column for displaying the number of the particular sub-procedure, a second column comprising an action column for displaying a vehicle action associated with the sub-procedure, a third column comprising a direction given in response to an affirmative response to the vehicle action associated with the sub-procedure, and a fourth column comprising a direction given in response to a negative response to the vehicle action associated with the sub-procedure.

7. The computer readable medium of claim 6, wherein at least one of the one or more sub-procedure links is displayed in the third column of the procedure pane.

8. The computer readable medium of claim 6, wherein at least one of the one or more sub-procedure links is displayed in the fourth column of the procedure pane.

9. The computer readable medium of claim 1, wherein the reference pane comprises a history window including one or more selectable areas corresponding to respective information that has previously been displayed in the reference pane.

10. The computer readable medium of claim 1, wherein the procedure pane and the reference pane are generally rectangular shaped.

11. The computer readable medium of claim 1, wherein the procedure and reference panes are horizontally aligned side by side in the graphical user interface.

12. A method of displaying information on a display device of a computing system, wherein the information is related to an object, the method comprising:

receiving an input from a user of the computer system indicating a selected object;

receiving an input from the user indicating a selected procedure related to the selected object, wherein the selected procedure comprises a plurality of sub-procedures;

allocating a total display area of the display device into two non-overlapping panes, namely, a procedure pane and a reference pane;

displaying in the procedure pane information related to performing the selected procedure on the selected object;

displaying in the reference pane information related to the selected object and the selected procedure;

displaying in the procedure pane a plurality of sub-procedure tabs associated with the procedure pane such that each of the plurality of sub-procedure tabs relates to at least one of the plurality of sub-procedures, and updating the information displayed in the reference pane in response to a change in the sub-procedure displayed in the procedure pane in response to input from the user indicating selection of at least one of the plurality of sub-procedure tabs, the information displayed in the reference pane being related to the sub-procedure displayed in the procedure pane.

13. The method of claim 12, wherein the display device is disposed in a portable computing device.

14. The method of claim 12, wherein the information displayed in the reference pane comprises reference information compiled from multiple independent sources.

15. The method of claim 12, further comprising:

displaying in the procedure pane a plurality of sub-procedure links associated with the procedure pane such that at least one of the plurality of sub-procedure links is related to at least one of the plurality of sub-procedures; and updating the information displayed in the reference pane in response to a change in the sub-procedure displayed in the procedure pane in response to input from the user indicating selection of at least one of the plurality of sub-procedure links, the information displayed in the reference pane being related to the sub-procedure displayed in the procedure pane.

16. The method of claim 12, wherein the object comprises a vehicle.

17. The method of claim 12, wherein the selected procedure comprises a repair procedure that may be performed on the selected object.

18. The method of claim 12, wherein the selected procedure comprises a diagnostic procedure that may be performed on the selected object.

19. A method of selecting information for display on a portable computing device, wherein the information comprises task information displayed in a task pane and reference information displayed in a reference pane, wherein the task and reference information are concurrently displayed on the portable computing device, the method comprising:
- selecting a vehicle on which to perform a procedure, wherein the procedure is selected from the group comprising a diagnostic procedure and a repair procedure;
- receiving one or more symptoms from an input device;
- determining the procedure that is to be performed on the vehicle based on the selected vehicle and the one or more symptoms; and
- selecting a desired procedure from a list comprising a plurality of ranked procedures, the plurality of ranked procedures being related to a vehicle symptom and ranked according to information received from one or more vehicle service centers based on the effectiveness of the respective procedures in reducing the vehicle symptom.

20. The method of claim 19, wherein the step of selecting is performed by a user interacting with the portable computing device.

21. The method of claim 19, wherein the step of selecting is performed by the portable computing device in response to information received from an OBD connector of the vehicle.

22. A portable computing device having a display configured to concurrently display:
- a procedure pane including procedure information related to a procedure that may be performed on an automobile, wherein the procedure information comprises a plurality of sub-procedures related to steps of the procedure, and the display is configured to display one of the plurality of sub-procedures in the procedure pane in response to communication with an input device, the procedure pane further comprising one or more selectable items each associated with a respective sub-procedure, the selectable items being selected from the group comprising tabs, buttons, icons, and menus;
- a reference pane including one or more reference information tabs each corresponding to a particular piece of reference information that is related to the displayed one of the plurality of sub-procedures, wherein the one or more reference information tabs are updated in response to changing which of the plurality of sub-procedures is displayed; and
- a plurality of sub-procedure links associated with the procedure pane such that at least one of the plurality of sub-procedure links is displayed in the procedure pane and is related to at least one of the plurality of sub-procedures, the plurality of sub-procedure links configured to initiate change of the sub-procedure displayed in the procedure pane when one of the plurality of sub-procedure links is selected by the input device of the portable computing device.

23. The portable computing device of claim 22, wherein the selectable items comprise one or more sub-procedure tabs.

24. The portable computing device of claim 22, wherein the portable computing device is selected from the group comprising a notebook computer, a tablet computer, a personal digital assistant (PDA), and a cell phone.

25. A computer readable medium having a computer executable program executing on a computing device, wherein the computer executable program is configured to generate, on a display device, a graphical user interface including information related to a procedure, wherein the graphical user interface comprises:
- a first pane displaying vehicle information regarding a specific vehicle;
- a second pane displaying procedure information, wherein the procedure information comprises information for performing a procedure on the specific vehicle and is selected from the group comprising a repair procedure and a diagnostic procedure;
- a plurality of tabs associated with the second pane such that each of the plurality of tabs relates to at least one of a plurality of sub-procedures, the plurality of tabs configured to initiate change of the sub-procedure displayed in the second pane when one of the plurality of tabs is selected by an input device of the computing device, wherein the information displayed in the second pane is automatically updated in response to a change in the sub-procedure displayed in the second pane;
- a third pane displaying reference information regarding the specific vehicle, wherein the vehicle information, the procedure information, and the reference information are each related to the procedure and are each concurrently displayed on a display device; and
- a plurality of links associated with the second pane such, that at least one of the plurality of links relates to at least one of the plurality of sub-procedures, the plurality of links configured to initiate change of the sub-procedure displayed in the second pane when one of the plurality of links is selected by the input device, wherein the information displayed in the third pane is automatically updated in response to a change in the sub-procedure displayed in the second pane through selection of at least one of the plurality of links.

26. A computer readable medium having a computer executable program executing on a computing device, wherein the computer executable program is configured to generate, on a display device, a graphical user interface including information related to a vehicle, wherein the graphical user interface comprises:
- a procedure pane including procedure information, wherein the procedure information comprises a plurality of sub-procedures describing respective steps of the procedure, and the computer executable program is configured to display one of the plurality of sub-procedures in the procedure pane in response to communication with an input device of the computing device;
- a reference pane including selectable reference information tabs, each of the reference information tabs being related to the displayed one of the plurality of sub-procedures, wherein the reference information tabs are updated in response to changing which of the one of the plurality of sub-procedures is displayed; and
- a plurality of sub-procedure links associated with the procedure pane such that at least one of the plurality of sub-procedure links is displayed in the procedure pane and is related to at least one of the plurality of sub-procedures of the procedure pane, the plurality of sub-procedure links configured to initiate change of the sub-procedure displayed in the procedure pane when one of the plurality of sub-procedure links is selected by the input device of the computing device, wherein the information displayed in the reference pane is automatically updated in response to a change in the sub-procedure displayed in the procedure pane though selection of at least one of the plurality of sub-procedure links.

* * * * *

UNITED STATES PATENT AND TRADEMARK OFFICE
CERTIFICATE OF CORRECTION

PATENT NO.       : 7,444,216 B2                                    Page 1 of 1
APPLICATION NO.  : 11/035751
DATED            : October 28, 2008
INVENTOR(S)      : Kevin B. Rogers et al.

It is certified that error appears in the above-identified patent and that said Letters Patent is hereby corrected as shown below:

At Column 8, Line 37, please delete "10." and insert therefore, --110.--.

At Column 21, Line 53, please delete "colunms" and insert therefore, --columns--.

At Column 22, Line 34, please delete "sub-procedures," and insert therefore, --sub-procedures;--.

At Column 24, Line 24, after "such" please delete ",".

At Column 24, Line 64, please delete "though" and insert therefore, --through--.

Signed and Sealed this

Seventh Day of April, 2009

JOHN DOLL
*Acting Director of the United States Patent and Trademark Office*